US009659050B2

(12) United States Patent
Andrei et al.

(10) Patent No.: US 9,659,050 B2
(45) Date of Patent: May 23, 2017

(54) DELTA STORE GIVING ROW-LEVEL VERSIONING SEMANTICS TO A NON-ROW-LEVEL VERSIONING UNDERLYING STORE

(71) Applicants: Mihnea Andrei, Issy les Moulineaux (FR); Colin Florendo, Marlborough, MA (US); Anil Kumar Goel, Waterloo (CA)

(72) Inventors: Mihnea Andrei, Issy les Moulineaux (FR); Colin Florendo, Marlborough, MA (US); Anil Kumar Goel, Waterloo (CA)

(73) Assignee: SYBASE, INC., Dublin, CA (US)

(*) Notice: Subject to any disclaimer, the term of this patent is extended or adjusted under 35 U.S.C. 154(b) by 382 days.

(21) Appl. No.: 13/960,335

(22) Filed: Aug. 6, 2013

(65) Prior Publication Data
US 2015/0046413 A1 Feb. 12, 2015

(51) Int. Cl.
*G06F 17/30* (2006.01)
*G06F 11/14* (2006.01)

(52) U.S. Cl.
CPC .... *G06F 17/30362* (2013.01); *G06F 11/1448* (2013.01); *G06F 17/30309* (2013.01);
(Continued)

(58) Field of Classification Search
CPC ........... G06F 17/30362; G06F 11/1448; G06F 17/30309; G06F 17/30368;
(Continued)

(56) References Cited

U.S. PATENT DOCUMENTS 6,195,656 B1 * 2/2001 Ozbutun ........... G06F 17/30324
7,047,250 B1 * 5/2006 Agarwal ........... G06F 17/30312
(Continued)

OTHER PUBLICATIONS

Chris Jones, "A Brief Comparison of SAP IQ and HANA Column Store Databases", May 21, 2013, pp. 1-3.*
(Continued)

*Primary Examiner* — Etienne Leroux
*Assistant Examiner* — Jared Bibbee
(74) *Attorney, Agent, or Firm* — Sterne, Kessler, Goldstein & Fox P.L.L.C.

(57) ABSTRACT

A delta store giving row-level versioning semantics to a non-row-level versioning underlying store is described. An example method includes establishing a column-based in-memory database including a main store and a delta store, where the main store does not allow concurrent transactions on a same table and the delta store has a plurality of row-visibility bitmaps implementing a row-level versioning mechanism that allows concurrent transactions on the same table. A transaction associated with the column-based in-memory database is received. For each table read by the transaction, a version of the table in the delta store that represents a transaction-consistent snapshot of the database visible to the transaction is determined. Each table is represented in the main store and the delta store; and each version of the table is represented by one or more bitmaps. Upon execution of a DML as part of the transaction, for each table written by the transaction, the data changes generated by the transaction is recorded in the one or more bitmaps that represent a private version of the table. Upon commit of the transaction, for each table written by the transaction, a new public version of the table is generated based on the private version of the table, and the public version represents a new transaction-consistent snapshot of the database visible to subsequent transactions.

21 Claims, 19 Drawing Sheets

(52) U.S. Cl.
CPC .. *G06F 17/30368* (2013.01); *G06F 17/30371* (2013.01); *G06F 17/30312* (2013.01); *G06F 17/30315* (2013.01); *G06F 17/30339* (2013.01); *G06F 2201/80* (2013.01); *G06F 2201/825* (2013.01); *G06F 2201/84* (2013.01); *G06F 2201/87* (2013.01)

(58) Field of Classification Search
CPC ......... G06F 17/30371; G06F 17/30312; G06F 17/30315; G06F 17/30339; G06F 2201/80; G06F 2201/825; G06F 2201/84; G06F 2201/87
See application file for complete search history.

(56) References Cited

U.S. PATENT DOCUMENTS

| | | | |
|---|---|---|---|
| 7,933,881 B2 | 4/2011 | Richey et al. | |
| 8,046,334 B2 | 10/2011 | Hwang et al. | |
| 8,121,985 B2 * | 2/2012 | Krebs .................. | G09B 5/00 707/687 |
| 8,504,542 B2 | 8/2013 | Chang et al. | |
| 8,572,063 B2 | 10/2013 | Plattner et al. | |
| 8,713,046 B2 | 4/2014 | Vishnoi et al. | |
| 8,751,437 B2 | 6/2014 | Teichmann et al. | |
| 8,762,333 B2 | 6/2014 | McCline et al. | |
| 8,793,288 B2 | 7/2014 | Hempelmann et al. | |
| 8,935,205 B2 | 1/2015 | Hildenbrand et al. | |
| 9,026,538 B2 | 5/2015 | Promhouse et al. | |
| 9,075,841 B2 | 7/2015 | Larson et al. | |
| 9,098,522 B2 | 8/2015 | Lee et al. | |
| 9,542,424 B2 | 1/2017 | Plattner et al. | |
| 2005/0216462 A1 * | 9/2005 | Xiao ................. | G06F 17/30533 |
| 2009/0240663 A1 | 9/2009 | Plattner et al. | |
| 2011/0072188 A1 * | 3/2011 | Oh ......................... | G06F 3/061 711/102 |
| 2011/0219020 A1 * | 9/2011 | Oks ................. | G06F 17/30315 707/769 |
| 2012/0084278 A1 * | 4/2012 | Franke ............. | G06F 17/30587 707/719 |
| 2012/0221528 A1 * | 8/2012 | Renkes ............ | G06F 17/30315 707/674 |
| 2012/0323971 A1 | 12/2012 | Pasupuleti | |
| 2013/0097127 A1 * | 4/2013 | Mohapatra ........ | G06F 17/30946 707/693 |
| 2013/0179395 A1 * | 7/2013 | Heman ............. | G06F 17/30345 707/609 |
| 2014/0237004 A1 * | 8/2014 | Schreter ........... | G06F 17/30303 707/813 |
| 2015/0006466 A1 * | 1/2015 | Tonder ............. | G06F 17/30359 707/602 |

OTHER PUBLICATIONS

Walter Binder et al, "Multiversion concurrency control for the generalized search tree", 2009, Wiley InterScience, pp. 1-25.*
Vishal Sikka et al, "Efficient Transaction Processing in SAP HANA Database—The End of a Column Store Myth", May 20, 2012, ACM, pp. 731-741.*
Hasso Plattner, "A Common Database Approach for OLTP and OLAP Using an In-Memory Column Database", Jun. 29, 2009, ACM, pp. 1-7.*
Dave Dice et al., "Implicit Privatization Using Private Transactions", 2010, ACM, pp. 1-8.*

* cited by examiner

DELTA STORE GIVING ROW-LEVEL VERSIONING SEMANTICS TO A NON-ROW-LEVEL VERSIONING UNDERLYING STORE

BACKGROUND

With the development in modern computer architecture, fast communication among multi-core processors makes parallel processing possible. Because large main memory configurations are available and affordable, server settings with hundreds of cores and terabytes of main memory become a reality.

High performance database systems, such as in-memory databases, are adaptive to make full usage of the main memory provided by modern hardware. In such systems, all relevant data may be kept in main memory, so that read operations can be executed without disk I/O. The systems may be designed to minimize the number of CPU cache misses and to avoid CPU stalls due to memory access. One approach for achieving this goal is using column-based storage in memory, which leads to high spatial locality of data and instructions, so the operations can be executed completely in the CPU cache without costly random memory accesses.

In a column-based storage, the entries of a column are stored in contiguous memory locations. Columnar data storage allows highly efficient compression, such that the relevant data can be stored in main memory with less cost using data compression. The data structure that contains the main part of the data is called the main storage. The changes are taken over from the delta storage asynchronously at some later point in time. The separation into main and delta storage allows high compression and high write performance at the same time. The column store may implement MVCC (Multi Version Concurrent Control), which is based on having multiple versions of the same data in the database. When reading data it ensures that the operation reads the right set of versions required to get a correct and consistent view of the database. A Consistent View Manager may determine which version of the database that each operation is allowed to see depending on the current transaction isolation level.

A requirement for a concurrency control mechanism is to minimize its impact on performance. With multi version concurrency control, concurrent read operations see a consistent view of the database without blocking concurrent write operations. However, conventional database management systems, such as OLAP (Online Analytical Processing) database systems, implement a table-level versioning mechanism. OLAP databases allows complex analytical and ad-hoc queries within a rapid execution time. In the table-level versioning mechanism of an OLAP system, multiple read-only and read-write users can operate concurrently, as long as the writers are inserting data into (or deleting it from) different tables. Such approach does not allow a high degree of concurrency with high performance throughput. As a result, many existing OLAP Relational Data Base Management Systems (RDBMS), do not have mechanisms such as a row-level snapshot isolation MVCC that allow concurrent transactions on the same table, and they are not OLTP friendly. Furthermore, conventional OLAP systems do not implement a mechanism for an existing store to be extended to offer row-level snapshot isolation and be optimized for OLTP workloads, with minimal changes to the existing code. Therefore, conventional systems fail to provide an ideal concurrent control mechanism with optimal performance and scalability.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and sub-combinations thereof, for providing a delta store that gives row-level versioning semantics to a non-row-level versioning underlying main store. As will be described in further detail below, embodiments can implement a main store, a delta store, and a bitmap which covers the RID (Row ID) range of both main and delta stores. Embodiments provide that insertions are handled by inserting data into the delta store and marking the corresponding entries in the insertion bitmap visible to the transactions. Embodiments can further provide that deletions are handled by invalidating the corresponding entries in the deletion bitmap managed by the delta store. When the transaction is committed, embodiments generates a new bitmap representing a new public version of the table visible to subsequent transactions. Embodiments can accumulate the data changes generated by multiple transactions in the delta store, which merges with the main store upon reaching a threshold. Accordingly, embodiments enables an existing column store that has table-level versioning, to handle concurrent transactions on the same table with minimal changes to the existing code.

System

Figure 1:
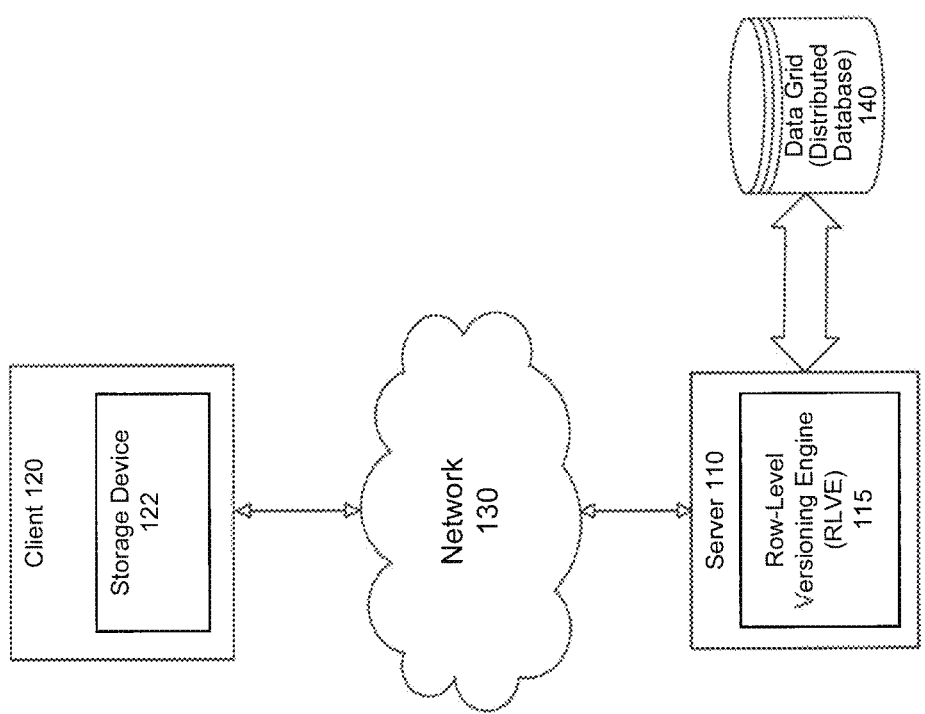
FIG. 1 illustrates a client/server system, according to an embodiment.

FIG. 1 illustrates a client/server system 100. System 100 includes a server 110, a Row-Level Versioning Engine (RLVE) 115, a client 120, a network 130, and a database 140.

Client 120 communicates with server 110 over the network 130. Specifically, client 120 may be connected to a Database Management System (DBMS) (not shown) on server 110 via network 130. In an embodiment, the DBMS includes Sybase® Adaptive Server® Enterprise (ASE) (available from Sybase, Inc. of Dublin, Calif.) and operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat). The network 220 includes functionality for packaging client calls in the well-known Structured Query Language (SQL) together with any parameter information into a format (of one or more packets) suitable for transmission to the DBMS. Client 120 may send SQL statement to server 110 and receive query result from server 110. Although only one server 110 is shown, more servers may be used as necessary. Network 130 may be any network or combination of wired and wireless networks that carry data communication. Such network can include, but is not limited to, a local area network, medium area network, and/or wide area network such as the Internet.

Client 120 includes a storage device 122. Although only one client 120 is shown, more clients may be used as necessary. Storage device 122, an example of which will be described in detail with respect to FIG. 19, can be any device for recording and storing information, which includes but is not limited to, flash memory, magnetic tape and optical discs.

Server 110 can host Row-Level Versioning Engine (RLVE) 115. As illustrated in FIG. 1, client 120 can send data requests to server 110, which can in turn invoke RLVE 115 for further processing. RLVE 115 can be software, firmware, or hardware or any combination thereof in a computing device. System 100 can be implemented on or implemented by one or more computing devices. As will be further described with respect to FIG. 19, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
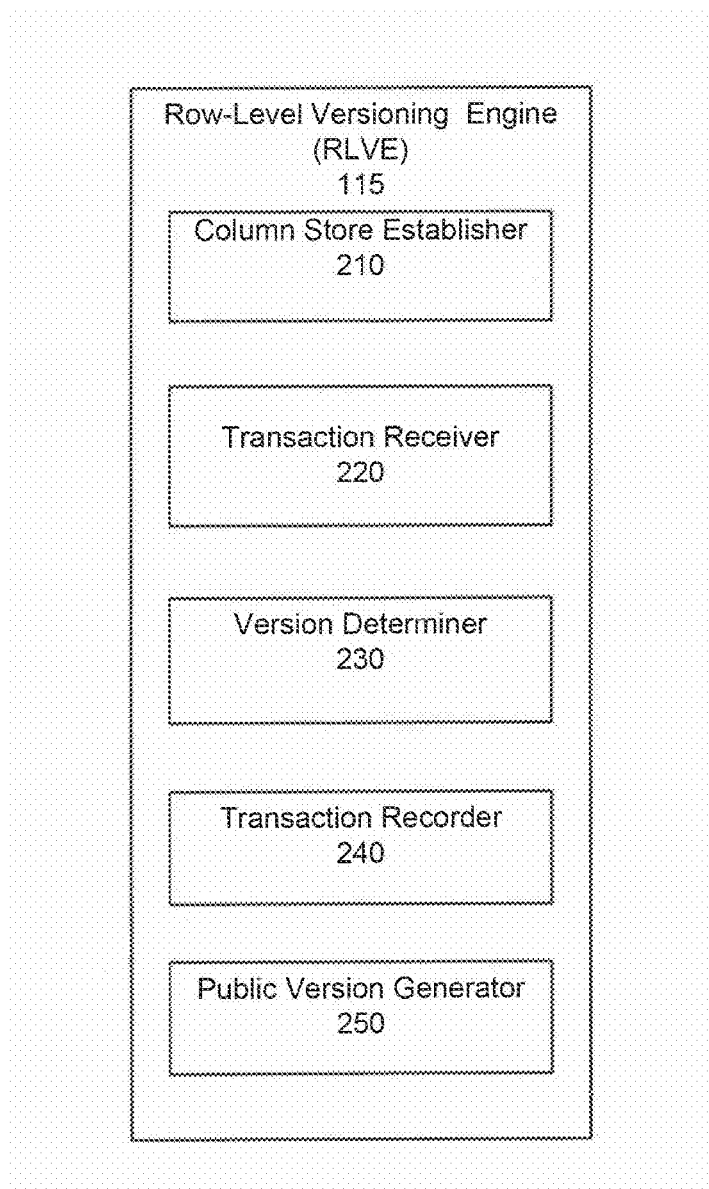
FIG. 2 illustrates elements of a Row-Level Versioning Engine (RLVE), according to an embodiment.

FIG. 2 illustrates elements of a Row-Level Versioning Engine (RLVE), according to an embodiment. In the example shown in FIG. 2, RLVE 115 includes column store establisher 210, transaction receiver 220, version determiner 230, transaction recorder 240, and public version generator 250.

Column store establisher 210 establishes a column-based in-memory database including a main store, and a delta store. In one embodiment, the main store does not allow concurrent transactions on a same table, while the delta store implements a row-level versioning mechanism that allows concurrent transactions on the same table. The delta store may include one or more bitmaps, which correspond to one or more versions of the table that provide consistent views to transactions that start at various points of time. Alternatively, the bitmaps may be located outside of the delta store, but managed by the delta store. The bitmaps that implement a row-level versioning mechanism are further illustrated in FIG. 4.

Transaction receiver 220 receives a transaction associated with the column-based in-memory database. For example, the transaction may insert a row into the column store of the in-memory database. Alternatively, the transaction may delete a row from the column store. Still alternatively, the transaction may update a row in the column store. Because an update may be interpreted as a deletion followed by an insertion, update operation is handled by the column store in the similar fashion as the deletion and insertion operations.

For each table read by a transaction, version determiner 230 determines a version of the table in the delta store that represents a transaction-consistent snapshot of the database visible to the transaction. In an embodiment, each table is represented in the main store and the delta store. For example, a table includes a main store portion and a delta store portion. In another embodiment, each version of the table is represented by one or more bitmaps. In still another embodiment, each bitmap is associated with a unique identifier; such as a commit ID of a transaction or a transaction timestamp. Function of version determiner 230 is further illustrated in FIG. 4.

Upon execution of a DML (Data Manipulation Language) as part of the transaction, for each table written by the transaction, transaction recorder 240 records data changes generated by the transaction the transaction in the one or more bitmaps that represent a private version of the table. In one embodiment, transaction recorder 240 may record the insert operations in an insert bitmap. In another embodiment, transaction recorder 240 may record the delete operations in a delete bitmap. In still another embodiment, transaction recorder 240 inserts a row in the delta store and also insert an entry in the insertion bitmap of the delta store for an insert operation. In still another embodiment, transaction recorder 240 invalidate the corresponding entry in the deletion bitmap of the delta store for a delete operation, wherein the invalidation occurs either in the delta store section of the deletion map, or a main store section of the deletion map, depending the location of the RID being deleted. In still another embodiment, when the transaction is an updating operation, transaction recorder 240 inserts both new data in the delta store of the table and corresponding entries in the insertion bitmap of the delta store; and further invalidating the corresponding entries in the deletion bitmap of the delta store, either in the delta store section or in the main store section of the bitmap. In still another embodiment, transaction recorder 240 may use a private bitmap to record operations contained in the transaction. Function of transaction recorder 240 is further illustrated in FIG. 5.

Upon commit of the transaction, for each table written by the transaction, public version generator 250 generates a new public version of the table with an based on the private version of the table, wherein the public version represents a new transaction-consistent snapshot of the database visible to subsequent transactions. In one embodiment, bitmap generator 250 may generate a new version of the table based on the aggregation of the private bitmap, which constitutes the private version of the table, and the insertion bitmap and the deletion bitmap. In another embodiment, public version generator 250 may generate a new public version of the table based on the private bitmap if it is kept up to date within the transaction. Function of transaction recorder 240 is further illustrated in FIG. 5.

Embodiments of the elements of RLVE 115 in FIG. 2, as described herein, may be further configured to run in parallel. Such parallel execution of these elements would increase the efficiency and speed of RLVE 115.

Method

Figure 3:
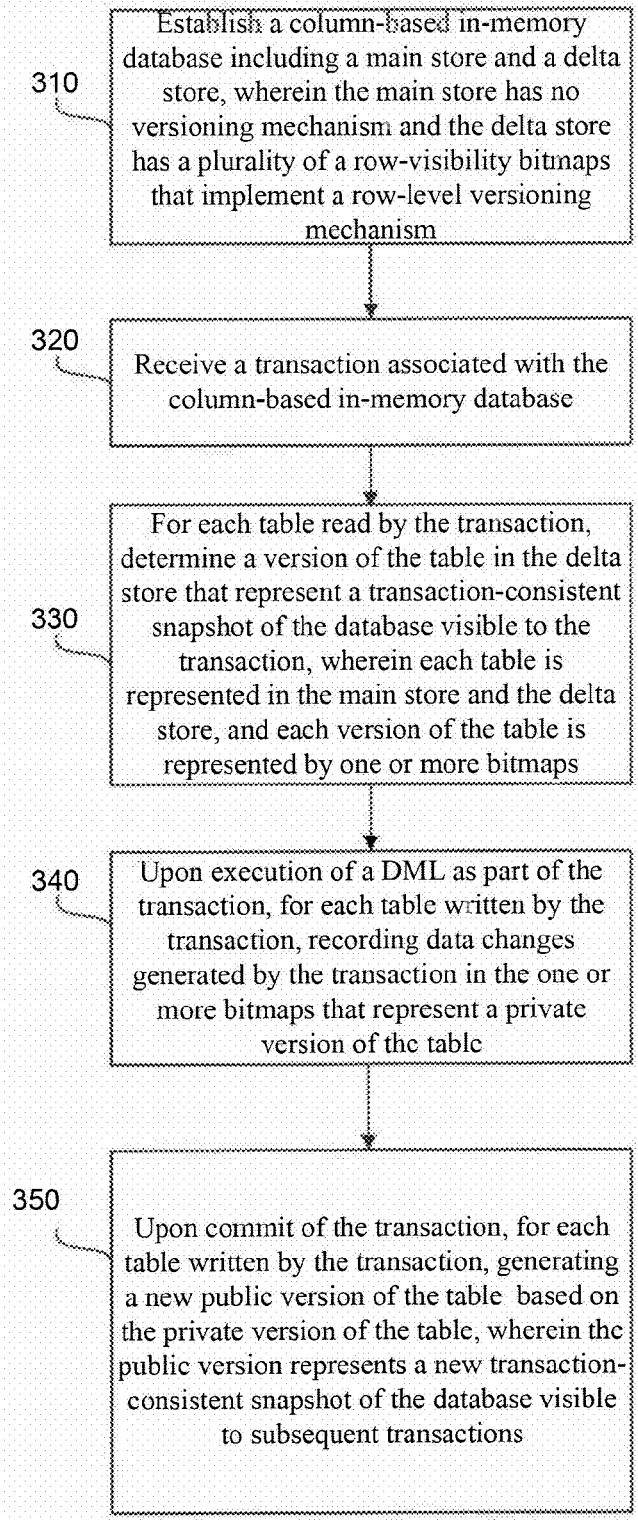
FIG. 3 is a flowchart for a method for using a delta store that gives row-level versioning semantics to a non-row-level versioning underlying store, according to an embodiment.

FIG. 3 is a flowchart for a method for using a delta store that gives row-level versioning semantics to a non-row-level versioning underlying store, according to an embodiment. In an embodiment, method 300 is performed by a server. For ease of explanation, method 300 will be described with respect to RLVE 115 of FIG. 2, which is in server 110, as described above. However, method 300 is not intended to be limited thereto.

At stage 310, a column-based in-memory database including a main store and a delta store is established. In an embodiment, the main store does not allow concurrent transactions on a same table and the delta store has a plurality of row-visibility bitmaps implementing a row-level versioning mechanism that allows concurrent transactions on the same table. For example, column store establisher 210 may establish the main store and the delta store. In another embodiment, a table in the column-based in-memory database may be represented by two portions: a main store portion and a delta store portion. In still another embodiment, the row-visibility bitmaps constitute different versions of the table visible various points in time to an internal transaction as well external transaction. Each bitmap may include a main store section, which covers the RID range of the table rows located in the main store, and a delta store section, which covers the RID range of the table rows located in the delta store.

At stage 320, a transaction associated with the column-based in-memory database is received. For example, transaction receiver 220 may receive the transaction associated with the column-based in-memory database.

At stage 330, for each table read by the transaction, a version of the table in the delta store that represents a transaction-consistent snapshot of the database visible to the transaction is determined. In one embodiment, each version of the bitmap is associated with a unique identifier. For example, bitmap version determiner may determine a version of the bitmap that visible to the transaction. In another embodiment, each table is represented in the main store and the delta store. In still another embodiment, each version of the table is represented by one or more bitmaps in the delta store.

At stage 340, upon execution of a DML as part of the transaction, for each table written by the transaction, the data changes generated by the transaction is recorded in the one or more bitmaps that represent a private version of the table. For example, transaction recorder 240 may record the data changes generated by the transaction in the private bitmap.

At stage 350, upon commit of the transaction, for each table written by the transaction, a new public version of the table is generated based on the private version of the table, and the public version represents a new transaction-consistent snapshot of the database visible to subsequent transactions. For example, bitmap generator 250 may generate a new public version of the table visible to subsequent transactions by marking a private bitmap as public.

The details of stages 310-50 for using a delta store that gives row-level versioning semantics to a non-row-level versioning underlying main store will be further illustrated in FIGS. 4-18 below.

Figure 4:
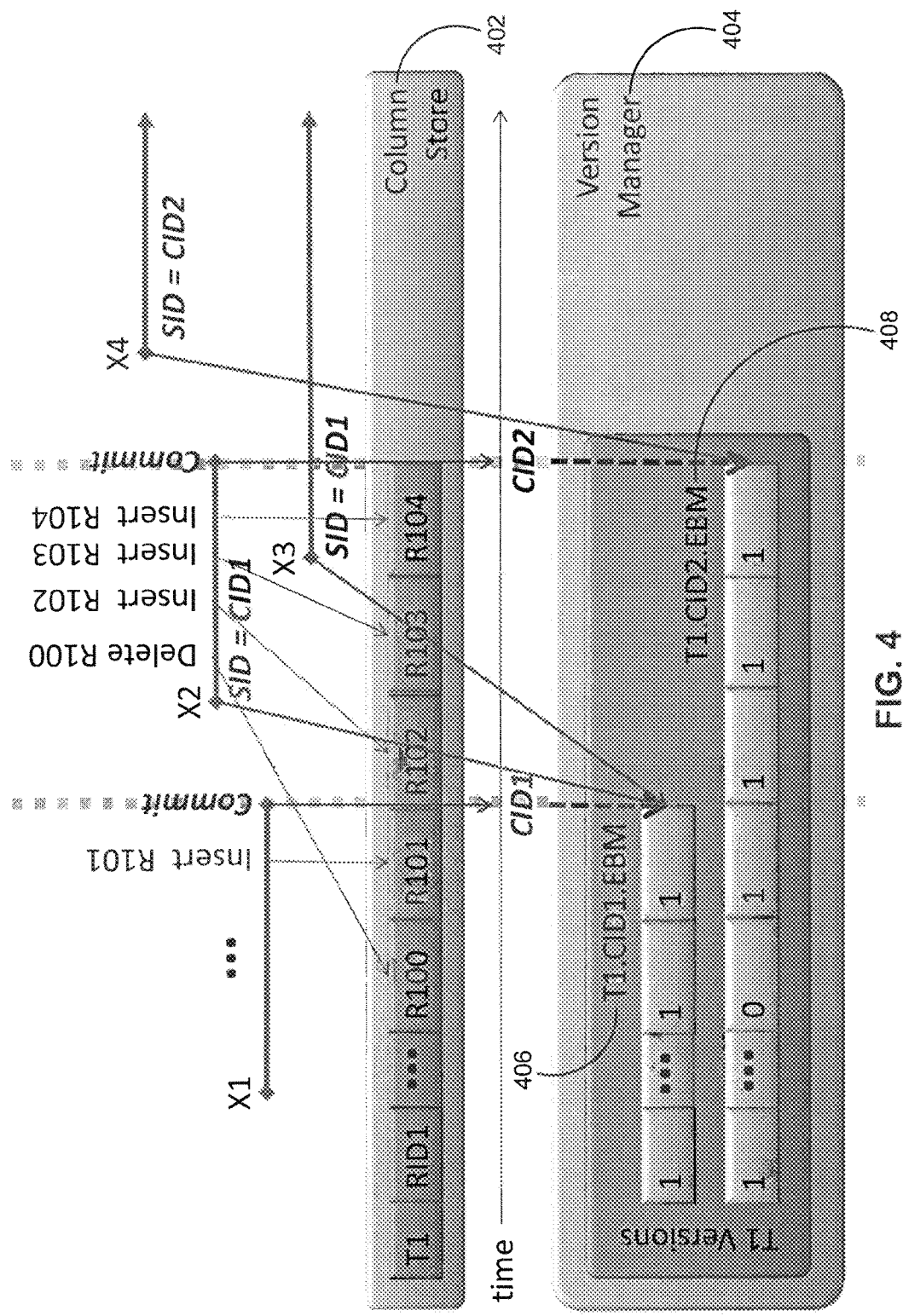
FIG. 4 depicts a plurality of snapshots visible to various transactions, according to an embodiment.

FIG. 4 depicts a plurality of versions of snapshots of a table visible to various transactions, according to an embodiment. In the example illustrated in FIG. 4, table T1 resides in column store 402 with RIDs spanning from 1 to 104. Version manager 404 manages two bitmaps for table T1: T1.CID1.EBM (Existence BitMap) and T2.CID2.EBM, representing two version of table T1. Although FIG. 4 only illustrates one table T1, multiple tables may reside in column store 401 and version manager 402 may manage bitmaps on multiple tables and their versions. Each bitmap or aggregation of bitmaps may provide a transaction-consistent snapshot or version of the table visible to the transaction.

In the example of FIG. 4, there are four transactions—committed transactions x1 and x2 and open transactions x3 and x4—each may start and commit at different points in time. Bitmaps for T1 may use commit IDs, such as CID1 and CID2 as unique identifiers, which correspond to commit IDs of transactions x1 and x2. Different bitmaps on base table T1 may be visible to different transactions at different point of times, thus providing transaction-consistent views for the table affected by the transactions at any given point of time. For example, bitmap version determiner 230 as illustrated in FIG. 2 may determine a table version/snapshot/bitmap visible to a transaction.

According to an embodiment, when transaction x1 commits, a bitmap for T1 is generated, namely bitmap 406 T1.CID1.EBM. When transaction x2 starts, because the last commit ID is CID1 and the corresponding bitmap visible to transaction x2 is bitmap 406 T1.CID1.EBM. As time lapses and transaction x2 commits, a new bitmap—bitmap 408 T1.CID2.EBM is generated. Notably, in this example, x2 includes four operations, delete R100, insert R102, insert R103 and insert R104. X2 does not contain the so called "read-my-write" operations—where an insert or delete operation is followed immediately by a read operation.

Subsequently, transaction x3 starts. Given that only transaction x1 has committed, the last commit ID with regard to x3 is CID1. Thus, the snapshot of table T1 visible to x3 is bitmap 406 T1.CID1.EBM. Before x3 commits but after x2 commits, transaction x4 starts. Since transaction x2 commits before x4 starts, the last commit ID with regards to x4 is CID2 and accordingly the snapshot of T1 visible to x4 is bitmap 408 T1.CID2.EBM.

Figure 5:
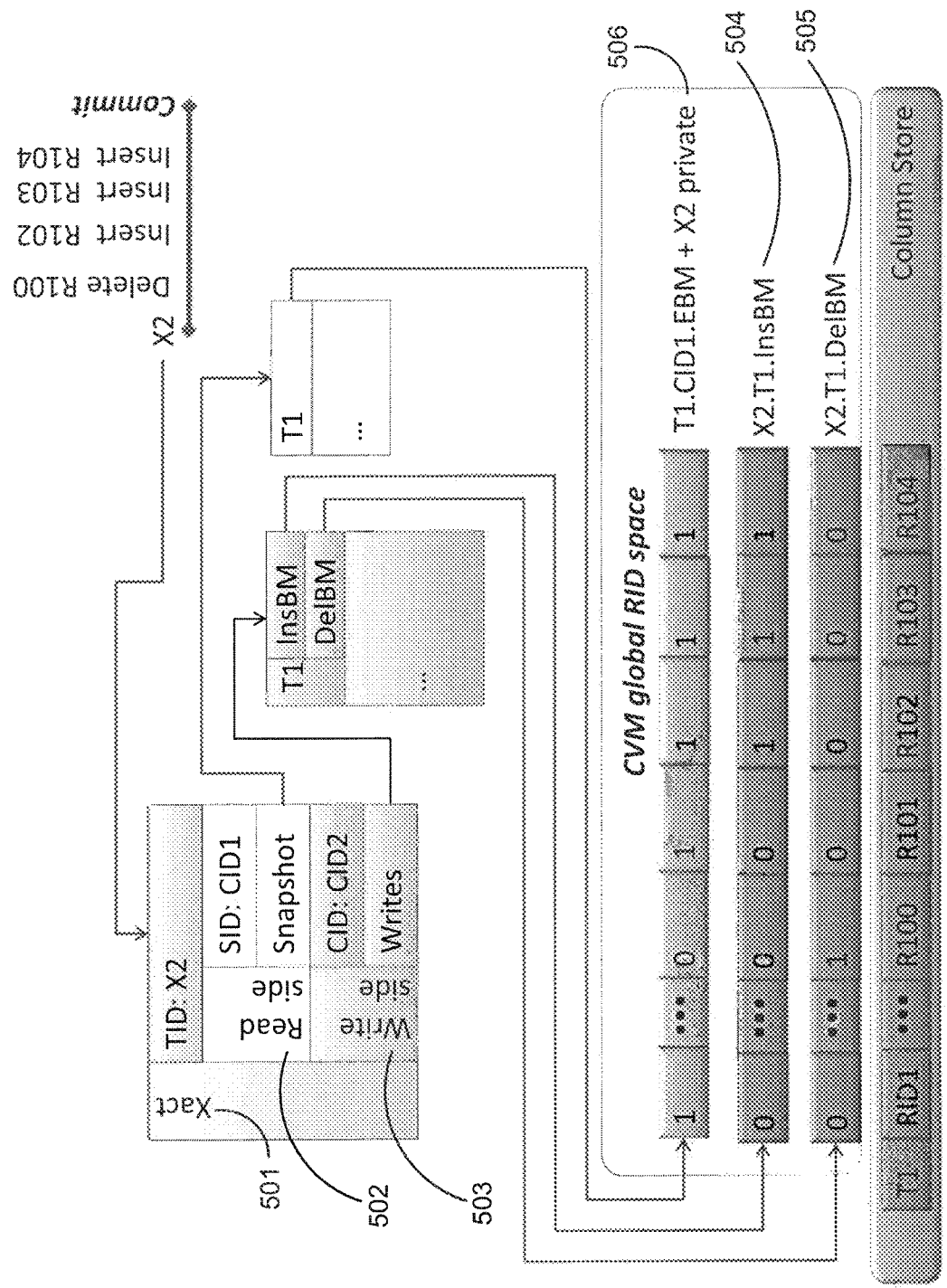
FIG. 5 shows an example transaction control block, according to an embodiment.

FIG. 5 shows an example transaction control block, according to an embodiment. A transaction block 501 may have a read side 502 and a write side 503. In this example, transaction block 501 is associated with transaction x2 illustrated in FIG. 4, which contains a delete operation and followed by three insert operations on table T1. For example, transaction recorder 240 may record the internal operations of the transaction in an insert or delete bitmap.

On read side 502, as discussed in FIG. 4 and before the start of x2, the snapshot visible to x2 is bitmap T1.CID1.EBM, which serves as a baseline for transaction x2. Upon execution of the delete and insert operations of x2, a new bitmap T1.CID2.EBM may be generated after x2 commits. Rather than inserting or deleting the corresponding rows in the main store directly, all insertions and deletions are handled by an insert bitmap 504 x2.T1.InsBM and a delete bitmap 505 x2.T1.DelBM respectively. For example, for the operation "delete R100," RID 100 is invalidated in bitmap 505 x2.T1.DelBM by setting the corresponding bit to "1," indicating RID 100 is marked as deleted. For operation "insert R102," an entry is inserted into bitmap 504 x2.T1.InsBM corresponding to RID 102. Thus, all the insertions and deletions are recorded in bitmap 504 x2.T1.InsBM and bitmap 505 x2.T1.DelBM, indicating which rows in the column store are inserted or deleted. Due to the fact that an update operation (not shown) can be interpreted as a deletion followed by an insertion, update can be handled in the similar fashion by bitmap 504 x2.T1.InsBM and bitmap 505 x2.T1.DelBM.

Bitmap 506 T1.CID1.EBM+x2 private may incorporate all operations of x2. In one embodiment, bitmap 506 is generated by a union of baseline T1.CID1.EBM with bitmap 504 x2.T1.InsBM, and a substation of bitmap 505 x2.T1.DelBM from the baseline. Bitmap 506 T1.CID1.EBM+x2 is only visible to x2 until transaction x2 commits. Because transaction x2 records the internal operations in its private bitmap 506, x2 may "read-my-write" by examining bitmaps 504-506. Private bitmap 506 is not visible to other transactions, unless transaction x2 commits.

On write side 503, when transaction x2 commits, it creates the unique identifier CID2 and the corresponding bitmap T1.CID2.EBM. In one embodiment, T1.CID2.EBM is generated by marking private bitmap 506— T1.CID1.EBM+x2 private—public and thus makes it visible to all subsequent transactions and a public version of the table T1 is generated. Alternatively, T1.CID2.EBM is generated by applying the changes recorded in bitmap 504 x2.T1.InsBM and bitmap 505 x2.T1.DelBM to baseline bitmap T1.CID.EBM. In this case, the bitmap 506— T1.CID1.EBM+x2 private may be created lazily upon commit time, while the operations are accumulated in bitmap 504 x2.T1.InsBM and bitmap 505 x2.T1.DelBM. For example, bitmap generator 250 of FIG. 2 may generate a new public version of the bitmap that represents a new transaction-consistent snapshot of table T1 in the database.

Figure 6:
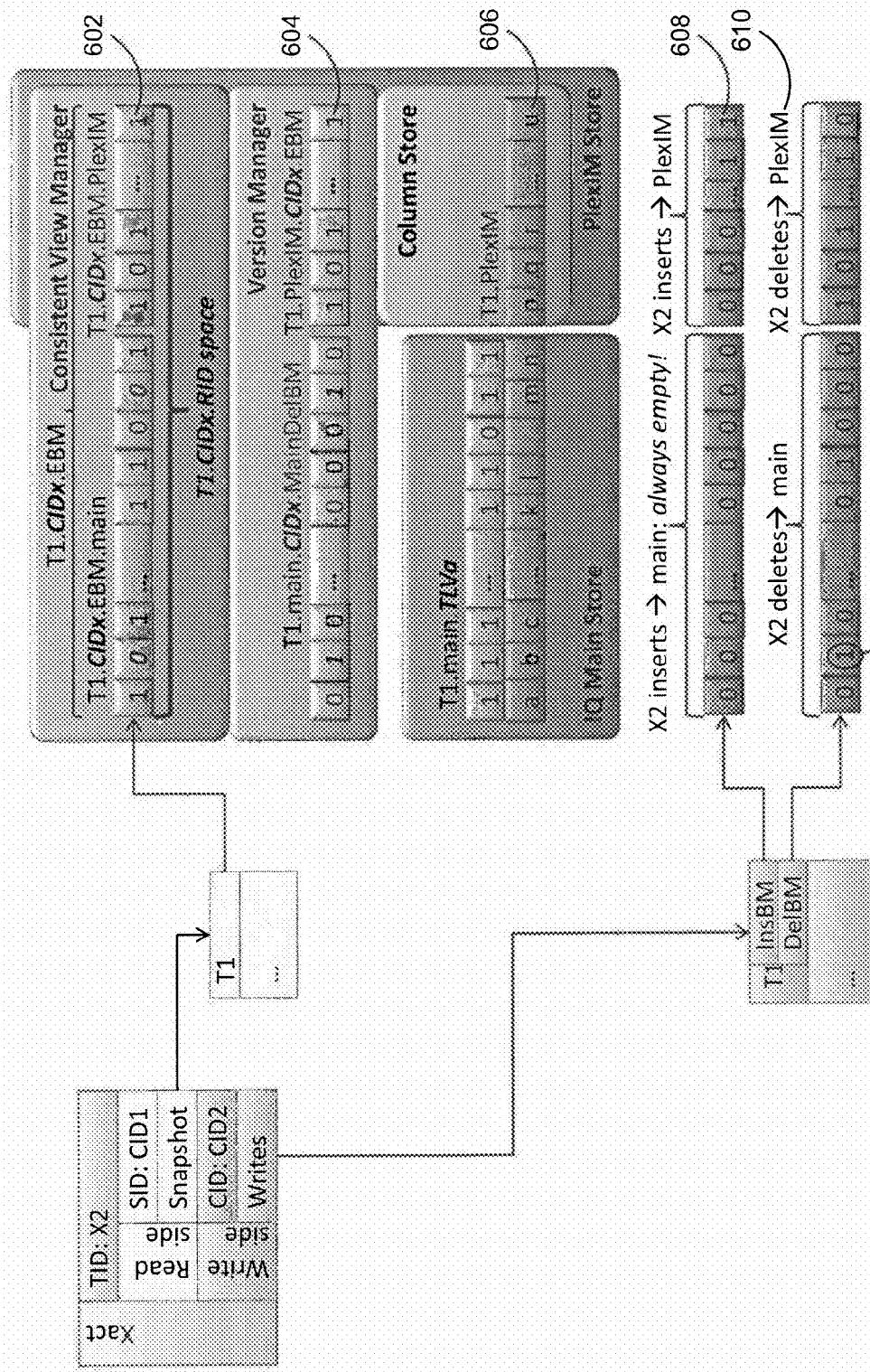
FIG. 6 depicts bitmap insertion and deletion operations, according to an embodiment.

FIG. 6 depicts bitmap insertion and deletion operations, according to an embodiment. In the example illustrated in FIG. 6, the bitmap operations implement a public bitmap 602, a private bitmap 604, a column store 606, an insert bitmap InsBM 608 and a delete bitmap DelBM 610. In one embodiment, column store 606 manages data organized in columns in memory, where database tables created as "column tables" are stored. Column store 606 may be optimized for high performance of read operations while providing good performance for write operations. Additionally, efficient data compression may be applied to save memory and to speed up searches and calculations in column store 606.

Column store 606 may include a main store 606(*a*) and a delta storage—PlexIM store 606(*b*). The data structure that contains the main part of the data is called main store 606(*a*). In an embodiment, for or each table, the main store portion of the table stores rows of the table with a certain RID range, and the delta store portion of the table stores rows of the table with another RID range. In an embodiment, write operations in column store 606 do not directly modify compressed data in main store 606(*a*). Rather, all changes are written into a separate data structure, delta store or PlexIM store 606(*b*), because delta store 606(*b*) may use basic compression and is optimized for write access. The delta storage may exist only in main memory. The separation into main and delta storage allows high compression and high write performance at the same time.

Main store 606(*a*) and PlexIM store 606(*b*) may be appended, with PlexIM store 606(*b*) on top of main store 606(*a*). For example, main store 606(*a*) has a RID range from 1 to 1 million and the next row with RID 1 million and 1 is in PlexIM store 606(*b*). Alternatively, there may be a gap between Main store 606(*a*) and PlexIM store 606(*b*). For example, PlexIM store 606(*b*) starts with RID 2 million and 1.

In one embodiment, column store 606 implements MVCC, which is based on having multiple versions of the same data in the database. When reading data it may need to ensure that the operation reads the right set of versions in order to get a correct and consistent view of the database. Main store 606(*a*) may implement a table-level versioning mechanism that does not allow concurrent transactions on the same table. In such a mechanism, and at the user-visible level, the unit of versioning is the table. With table-level versioning, access to the data is controlled at the table level where write operations occur, and where query results are focused. In contrast, delta store 606(*b*) may implement a row-level versioning mechanism, which allows concurrent transaction on the same table. Accordingly, from a user's point of view, the entire column store supports row-level versioning and accept concurrent transactions on the same table.

Likewise, InsBM 608 and DelBM 610 each may contain two portions, with one portion covering the corresponding main store RID range and the other portion covering the corresponding delta store RID range. In one embodiment, all inserts go into delta store 606(*b*), while main store 606(*a*) remains the same until a merge occurs. Thus, InsBM 608(*a*) corresponding to main store 606(*a*) is always empty, while InsBM 608(*b*) for the PlexIM store records the inserts. Delete may be recorded in DelBM for both main store 606(*a*) and PlexIM store 606(*b*). For example, if a row exists in main store 606(*a*), a deletion sets a bit 612 in DelBM 610(*a*) to indicate the corresponding row is invalidated in main store BM 606(*a*).

In the example illustrated in FIG. 6, element 612 of DelBM for main store is set to 1, indicating the corresponding row (e.g. RID 102) is deleted. For "read-my-write" operations on the read side of transaction x2, the deletion is also marked in MainDelBM 604(*a*). Bitmap T1.CIDx.EBM.main 602(*a*) is the logic view of the main store bitmap that is visible to subsequent transactions, once transaction x2 is committed. In some embodiments, it is not necessary for T1.CIDx.EBM.main 602(*a*) to be materialized, as it is a negation of T1.main.CIDx.MainDelBM 604(*a*).

Notably, main store 606(*a*) may serve as a baseline for all versions/snapshots of table T1 visible to all transactions. Main store 606(*a*) may not be changed until it merges with delta store 606(*b*). After the merge, main store 606(*a*) is updated to represent a new version of the table, while it is still implementing table-level versioning. Thus, main store 606(*a*) is decoupled from user transactions, which are accumulated in delta store 606(*b*) until the merge occurs.

In some embodiments, many user transactions may accumulate in delta store 606(*b*), until delta store becomes too big and reaches a threshold. Alternatively, delta store 606(*b*) may merge with main store 606(*a*) after a predefined period of time. Therefore, all changes to table T1 produced by user transaction are handled by the bitmaps representing the corresponding rows of main store 606(*a*) and delta store 606(*b*). Although FIG. 6 illustrates the bitmap operations on a single table T1, the bitmap operations are applicable to multiple tables, as shown in FIG. 7 below.

Figure 7:
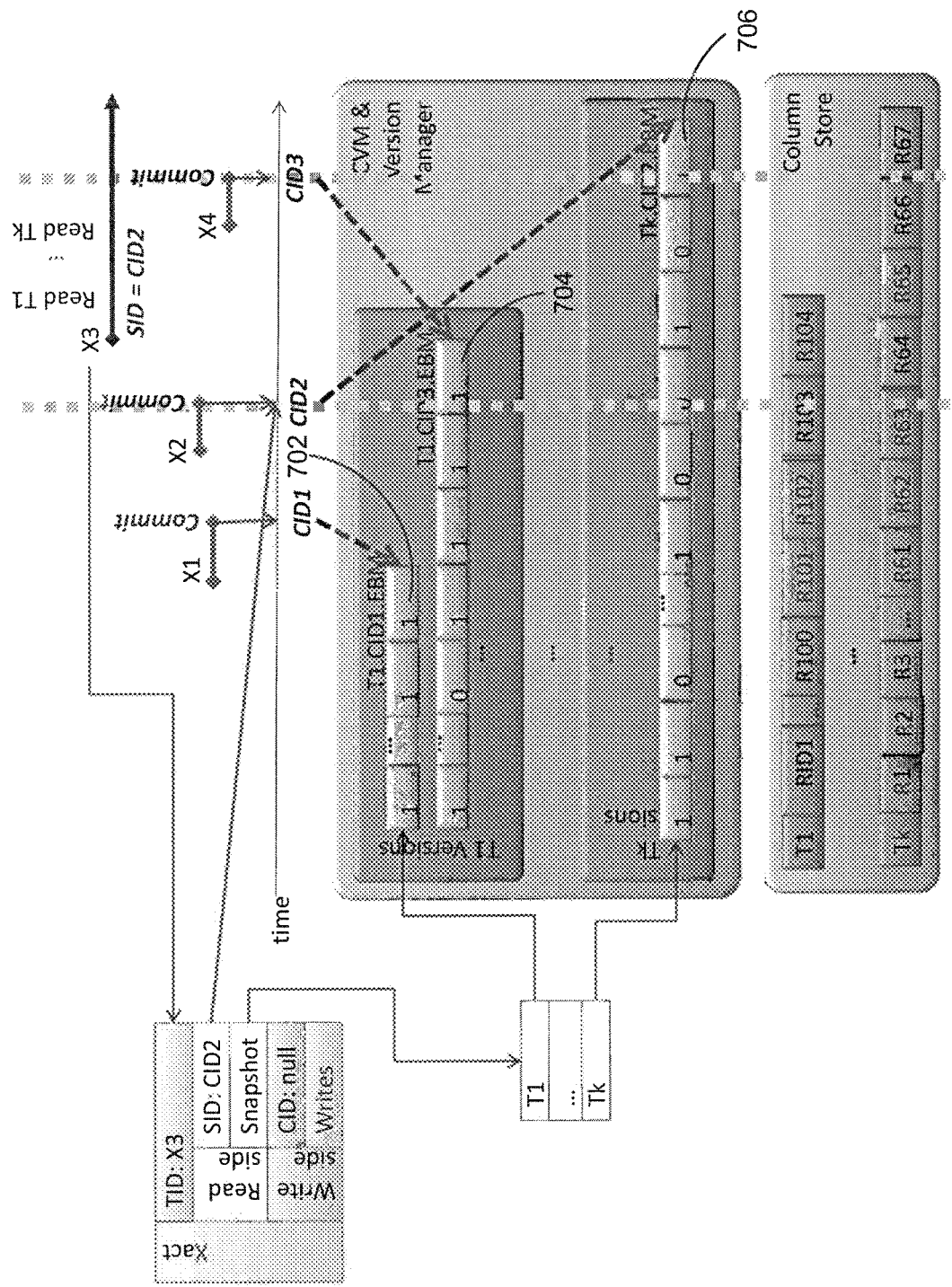
FIG. 7 illustrates bitmap operations on multiple tables, according to an embodiment.

FIG. 7 illustrates bitmap operations on multiple tables, according to an embodiment. In this example, there are a plurality of bitmaps that offer different versions of the snapshots visible for each transaction, when multiple tables T1 to Tk are accessed. For example, table T1 has two versions—T1.CID1.EBM 702 and T1.CID3.EBM 704. Because x1 has modified T1, and at the commit of x1 with commit ID CID1, bitmap T1.CID1.EBM 702 is generated.

In a similar fashion, because x2 has modified Tk, and at the commit of x2 with commit ID CID2, bitmap Tk.CID2.EBM 706 is generated. Each bitmap provides a version/snapshot of the base table.

When x3 starts, it reads from tables T1 and Tk. Because both x1 and x2 have committed before x3 starts, the versions of T1 and T3 visible to x3 is determined based on the commit ID equal to or smaller than the latest commit ID. Accordingly, as to table T1, x3 sees bitmap 702 T1.CID1.EBM and as to Tk, x2 sees bitmap 706 Tk.CID2.EBM.

When x4 starts, it sees bitmap 702 T1.CID1.EBM. When x4 commits, it generates CID3 and bitmap 704 T1.CID3.EBM.

Figure 8:
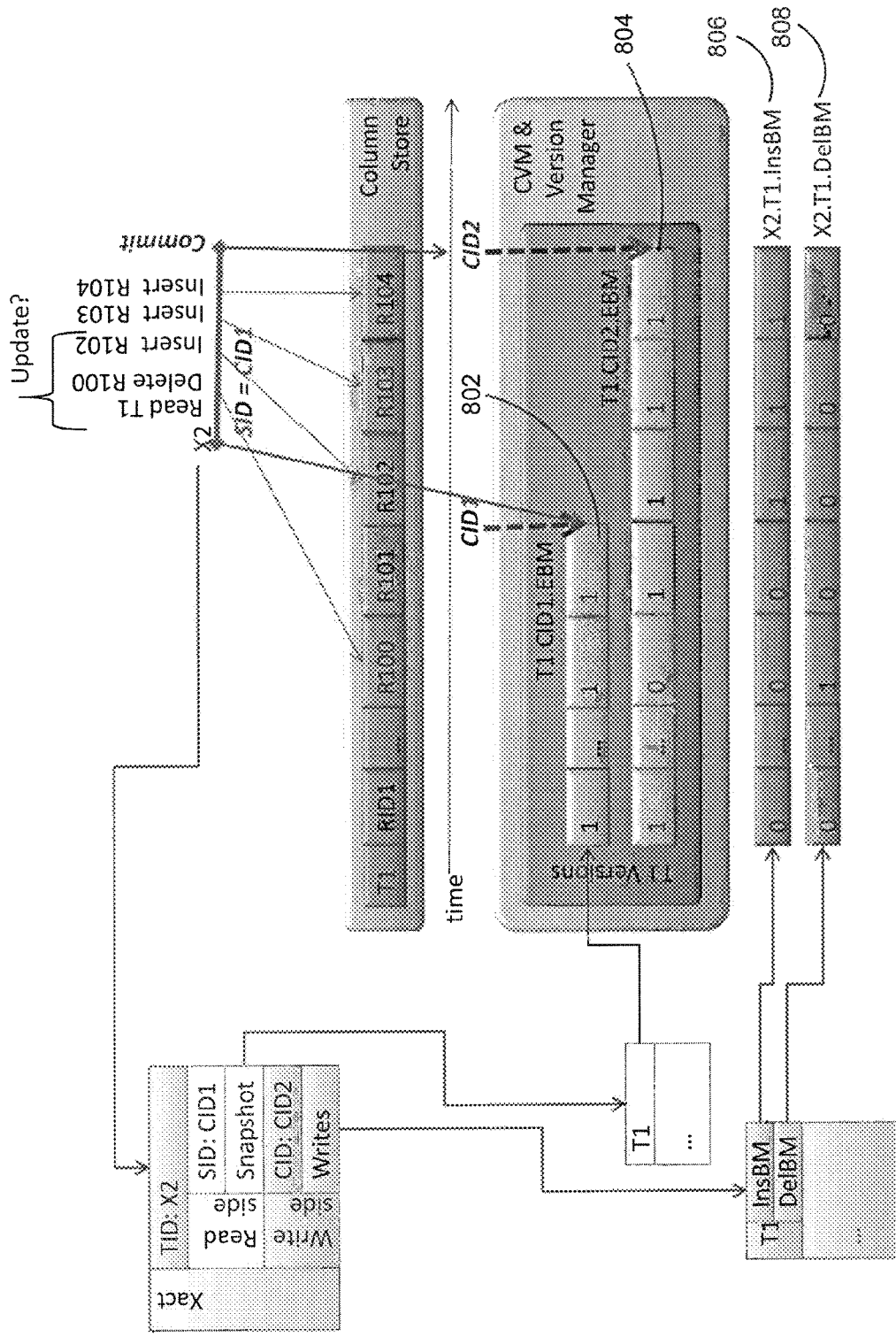
FIG. 8 illustrates the bitmaps for a transaction with multiple internal operations, according to an embodiment.

FIG. 8 illustrates the bitmaps for a transaction with multiple internal operations, according to an embodiment. In the example of FIG. 8, transaction x2 contains multiple operations, such as read T1, delete R100, insert R102, insert R103 and insert R104. When transaction x2 starts, the last committed transaction is x1, and the version of T1 visible to x1 is represented by bitmap 802 T1.CID1.EBM. Transaction x2 proceeds with reading table T1, followed by deleting R100. These two operations may be replaced by an update operation. Since the delete operation contains a where clause that qualifies the row to be deleted, x2 indeed reads T1 then deletes RID 100. The delete operation may be handled by a bitmap operation to invalidate the entry corresponding to RID 100 in bitmap 808 x2.T1.DelBM, where the bit corresponding to RID 100 is set to "1."

Transaction x2 then inserts RID 102, which is also handled by bitmap operations. As indicated in bitmap 806 x2.T1.InsBM, the corresponding entry for RID 102 is marked as "1." Before x2 commits, if there is another read operation occurs after "insert R102" operation, a private bitmap that accumulates the internal operations of x2 thus far may be needed. However, in this example, insert R102 operation is followed by insert R103 and R104, the private bitmap is not needed for x2 and it is not necessary to record the accumulated operations for a read operation in a private bitmap.

At noted above, when x2 starts, the latest version of T1 visible to x2 is bitmap 802 T1.CID1.EBM. At the conclusion of x2, bitmap 802 T1.CID1.EBM may union with bitmap 806 x2.T1.InsBM and may be subtracted by bitmap 808 x2.T1.DelBM. In the event that x2 commits, a new bitmap 804 T1.CID2.EBM is generated and may be marked as public as it is visible to any transactions starting at a point in time after x2 commits. Because there is no read in between the internal operations of x2, there is no need to generate a private bitmap to keep track the accumulative effect of the operations on the bitmap. As a result, bitmap 804 T1.CID2.EBM may be generated lazily at commit time.

Figure 9:
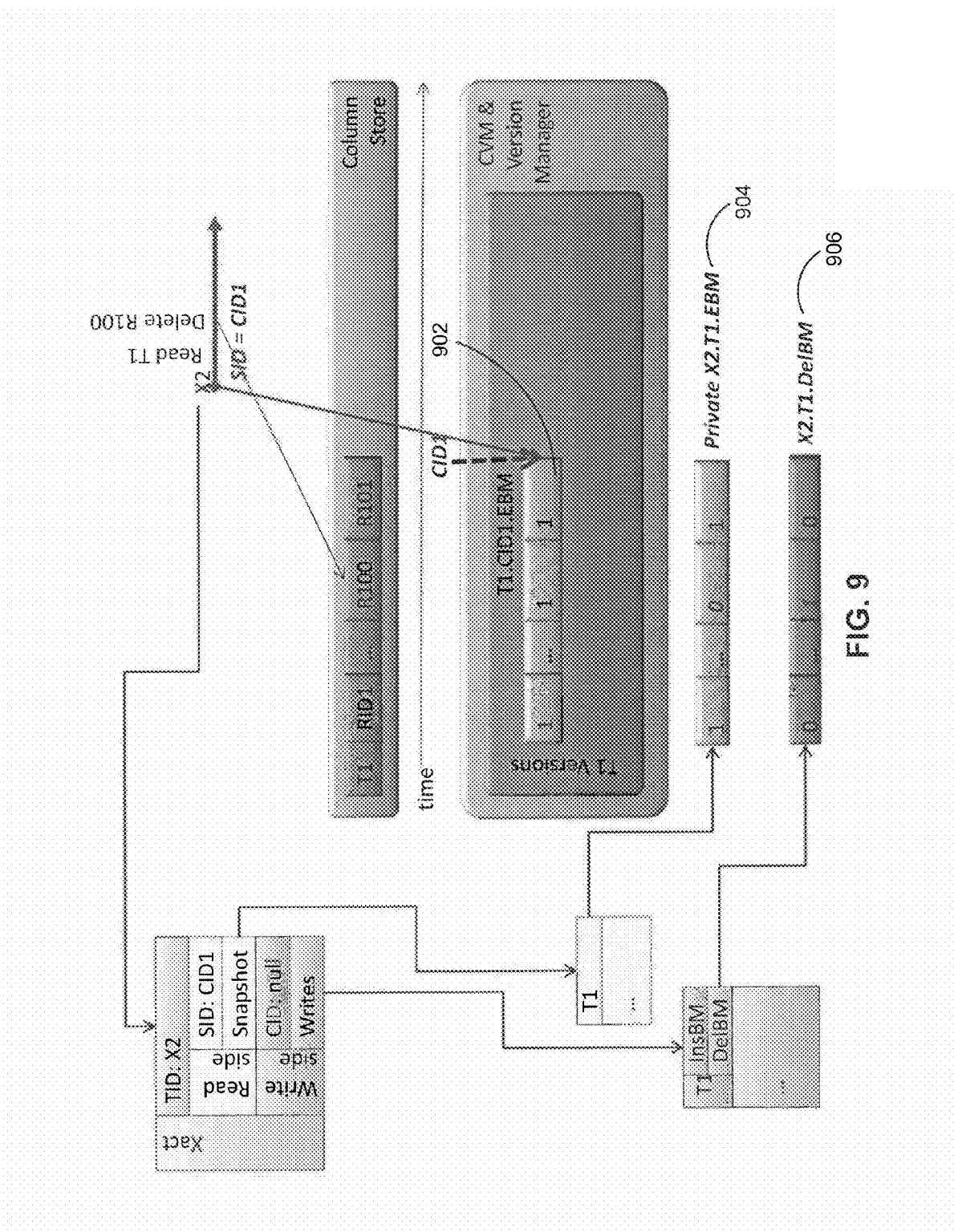
FIG. 9 shows the generation of a private bitmap, according to an embodiment.

FIG. 9 shows the generation of a private bitmap, according to an embodiment. In the event that a private bitmap, such as a private bitmap is created, rather than referencing public bitmap 902 T1.CID1.EBM, snapshot of T1 points to bitmap 904 private x2.T1.EBM on the read side. This is in contrast with FIG. 8, where the snapshot of T1 points to public bitmap 802 T1.CID1.EBM on the read side. In the example of FIG. 9, after the read T1 operation, the next operation is delete R100, which is recorded in bitmap 906 x2.T1.DelBM. Bitmap 904 private X2.T1.EBM may be a negation of bitmap 906 x2.T1.DelBM. Therefore, private bitmap 904 may be kept up to date once created and may be updated by subsequent operations of x2, which will be illustrated in FIG. 10.

Figure 10:
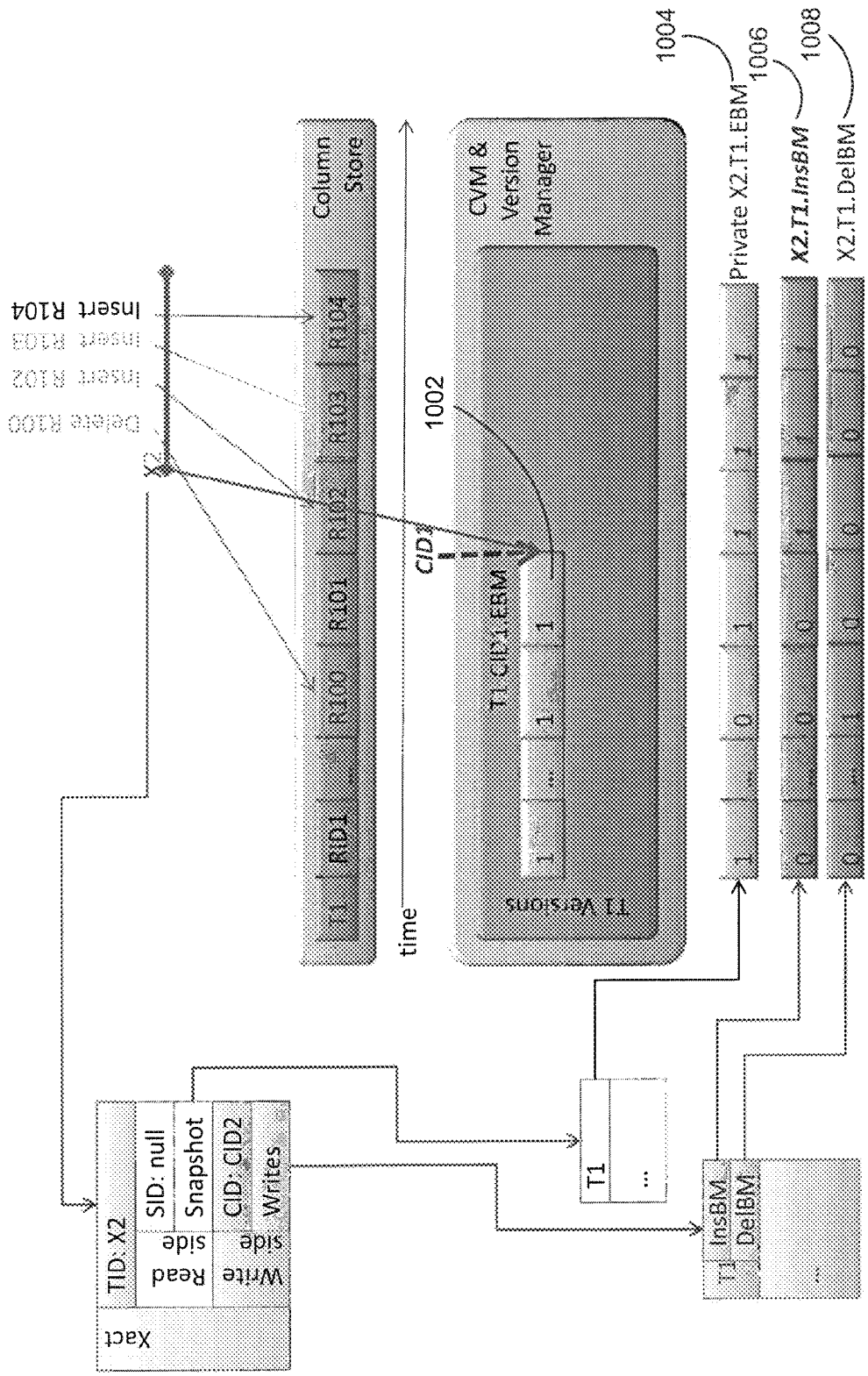
FIG. 10 shows the internal operations of a transaction on a private bitmap, according to an embodiment.

FIG. 10 further shows the internal operations of a transaction on a private bitmap, according to an embodiment. For example, after "delete R100" operation, x2 is followed by three insert operations that insert R102-104 respectively.

As previously discussed, bitmap 1002 T1.CID1.EBM provides a baseline for transaction x2. In one embodiment, the internal operations of x2 may be handled by bitmaps 1006 x2.T1.InsBM and 1008 x2.T1.DelBMBitmap. Delete R100 operation is recorded in bitmap 1008 x2.T1.DelBMBitmap with row 100 marked as "1." The rest of the entries in bitmap 1008 x2.T1.DelBM are set to "0" because delete R100 is the only delete operation in transaction x2. Insert operations R102-104 are recorded in bitmaps 1006 x2.T1.InsBM, with rows R102-104 set to "1" and the rest of the entries remain to be "0."

Before x2 commits, if there is a read operation (a.k.a. "read-my-write") of T1, the snapshot visible to the read side of x2 internally is bitmap 1004 private x2.T1.EBM. In this example, bitmap 1004 private x2.T1.EBM is generated dynamically based on the aggregation of bitmaps 1006 x2.T1.InsBM and 1006 x2.T1.DelBMBitmap. Once bitmap 1004 private x2.T1.EBM is created, it may be always kept up to date.

Figure 11:
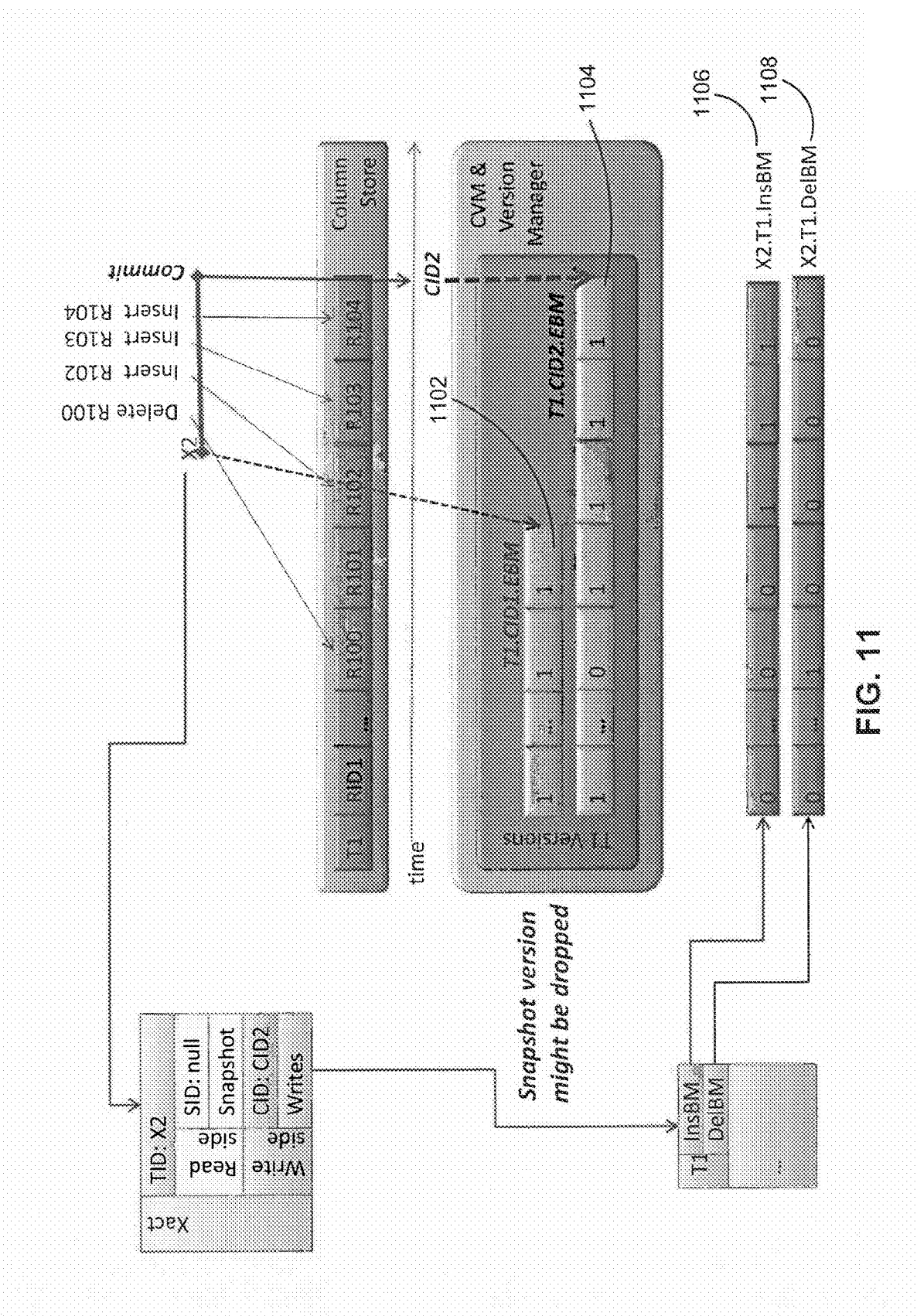
FIG. 11 illustrates bitmaps for an isolated transaction, according to an embodiment.

FIG. 11 illustrates bitmaps for an isolated transaction, according to an embodiment. In this example, an isolated transaction x2 operates on table T1, while no other transaction operate on the same table during the life cycle from x2 starts to x2 commits. Further, there is no other reader or writer accessing table T1 during the same period. Transaction x2 includes a delete operation, followed by three insert operations. In this embodiment, there is no read operation among the internal operations of x2. Thus, a private bitmap only visible to x2 may be created lazily until commit time. For example, a private bitmap is created based on baseline bitmap 1102 T1.CID1.EBM aggregated with bitmaps 1106 x2.T1.InsBM and 1108 x2.T1.DelBM. When x2 commits with commit ID CID2, the private version of the table represented by the bitmap is converted to a public version of the table represented by bitmap T1.CID2.EBM visible to all subsequent transactions. Additionally, due to the fact that there is no other reader or writer between transactions x1 and x2, the previous snapshot of T1—bitmap 1102 T1.CID2.EBM may be dropped once the private bitmap of x2 becomes public. This is a life cycle of an isolated transaction.

Figure 12:
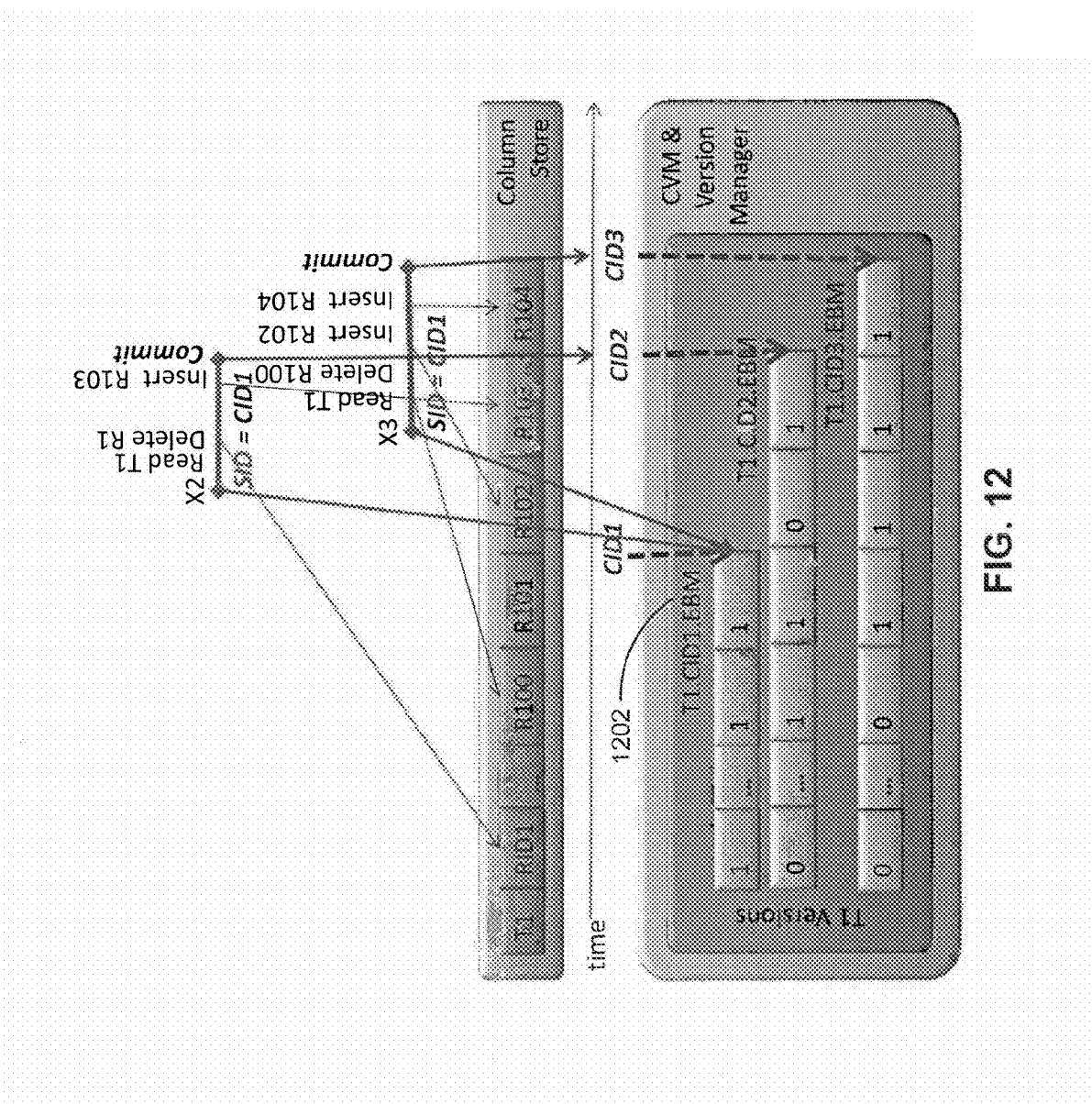
FIG. 12 illustrates bitmaps for concurrent transactions, according to an embodiment.

FIG. 12 illustrates bitmaps for concurrent transactions, according to an embodiment. In this example, transactions x2 and x3 both operate on table T1 concurrently. As shown below, the complexity of concurrent transactions may be shielded from main store which does not allow concurrent transactions on the same table. Indeed, the implementation of the bitmap representation of both the main and a delta store, as well as an delta or PlexIM store, extends the functionality of main store without engaging the main store in concurrent transactions. However, from the user's point of view, the main store has the ability to handle concurrent transactions on the same table, while the complexity is absorbed internally by the bitmaps and the delta/PlexIM store.

In the embodiment of FIG. 12, transaction x2 includes a read T1 operation followed by delete R1 (corresponding to RID1) and insert R103 operations, then x2 commits. Transaction x3 includes a read T1 operation, followed by delete R100, insert 102 and insert R104 operations, then x3 commits. PlexIM store absorbs the complexity of concurrent transactions by inserting new rows in PlexIM and recording the entries in an insert bitmap without the involvement of main store at this stage of transaction. The deletions are handled by invalidating the entries in a delete bitmap that represents RID ranges of both main and PlexIM stores. Notably, main store may not aware of the insert and delete operations until a merge occurs. In this embodiment, FIG. 12 shows how to handle the complexity of the concurrent transaction even main store does not participate at all. Thus, the embodiment requires minimal code changes to the main store.

FIG. 12 also illustrates the final layout of the column store and bitmaps after all transactions x1 to x3 commit. In this example, the transactions operate according to the following sequence in time. First, x1 commits and is followed by the start of x2. The snapshot visible to x2 is bitmap 1202 T1.CID1.EBM.

Second, before x2 commits, transaction x3 starts. Since both x2 and x3 start before any one of them commits, the snapshot visible to both x2 and x3 is bitmap 1202 T1.CID1.EBM.

Third, x2 commits and creates a new bitmap 1204 T1.CID2.EBM. Because x3 starts before x2 commits, bitmap 1204 T1.CID2.EBM is not visible to x3. Likewise, x3 commits and creates a new bitmap 1206 T1.CID3.EBM, which is not visible to x2.

FIGS. 13-18 shows concurrent transactions operating on the same table, according to an embodiment. These figures further shows the concurrent transactions x2 and x3 as illustrated in FIG. 12, and they may share a same snapshot on the same table.

Figure 13:
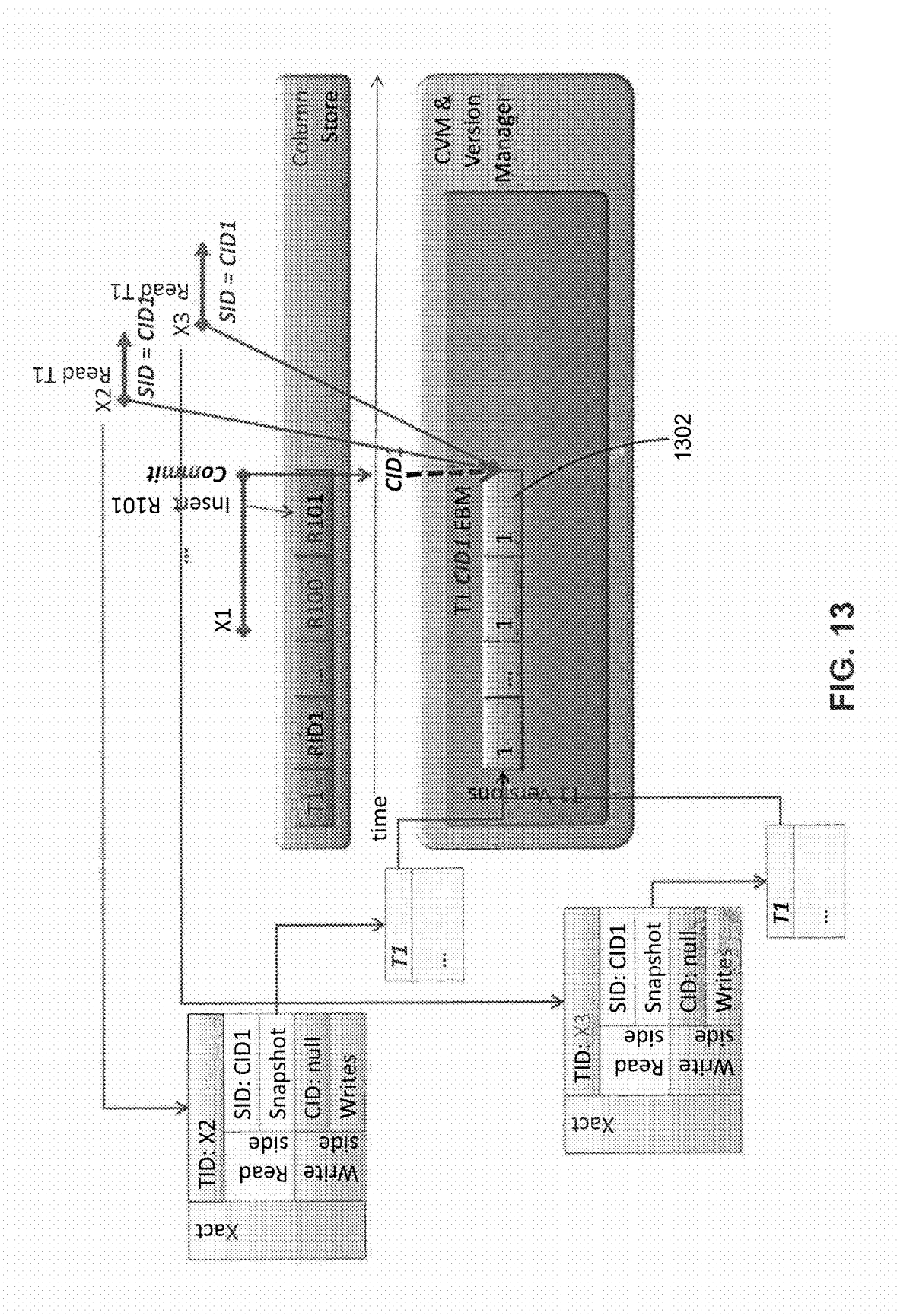
FIGS. 13-18 shows concurrent transactions operating on the same table, according to an embodiment.

In the example of FIG. 13, bitmap 1302 T1.CID1.EBM covers the RID ranges of both the main and PlexIM stores. Concurrent transactions x2 and x3 both see bitmap 1302 T1.CID1.EBM as the snapshot of table T1 and they both read from T1. Further operations of x2 and x3 will be illustrated in the figures below.

Figure 14:
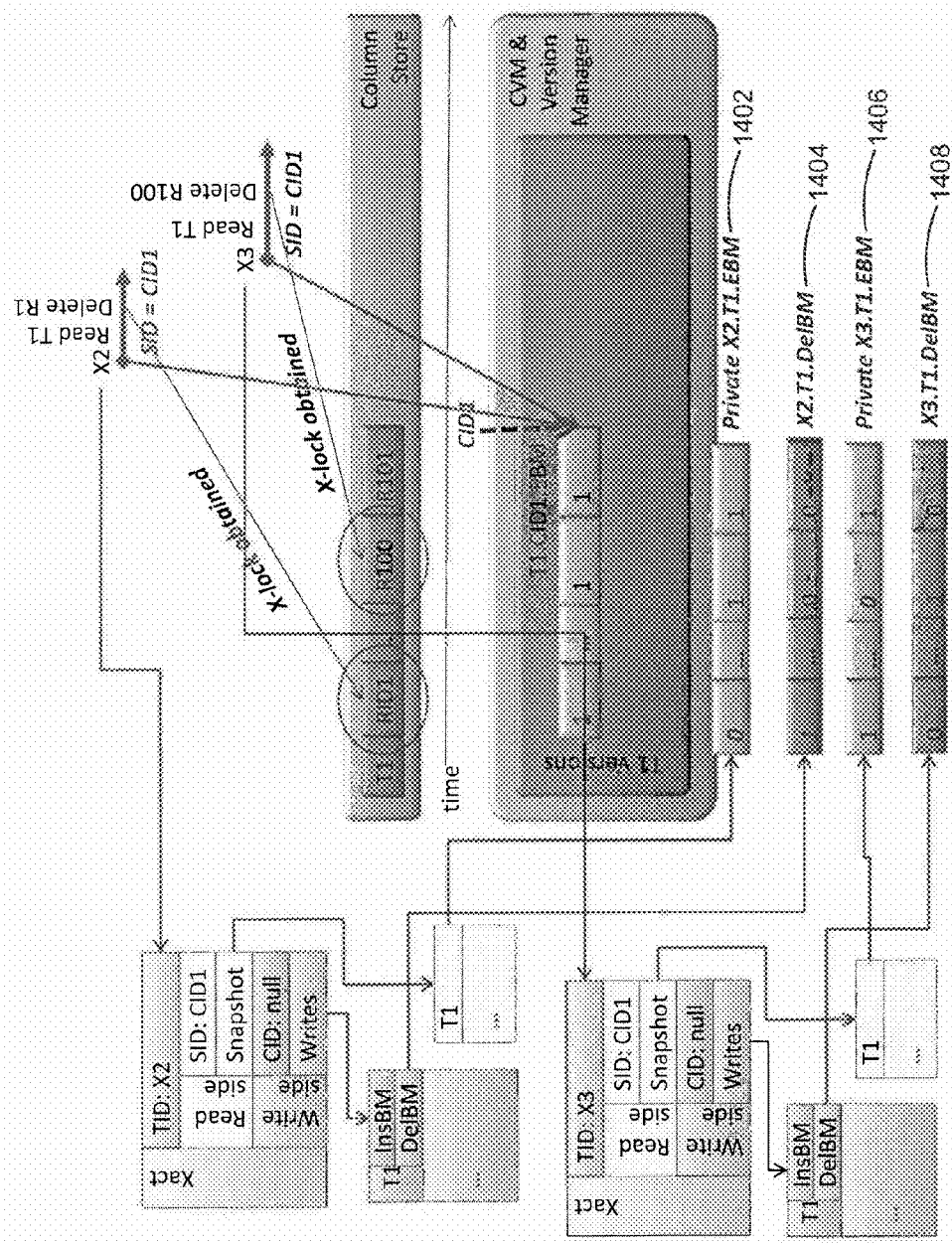

In FIG. 14, concurrent transactions x2 and x3 delete different rows of T1. Specifically, x2 deletes R1 (corresponding to RID1) and x3 deletes R100 respectively. In this embodiment, both transactions behave independently as noted above. For example, the deletions are recorded in bitmaps 1404 x2.T1.DelBM and 1408 x3.T1.DelBM. Further, bitmap 1402 private x2.T1EBM for x2 and bitmap 1406 private x3.T1.EBM for x3 are allocated. Alternatively, the private bitmaps 1402 and 1406 may be allocated until they are required by a read operation.

After x2 deletes R1 represented by RID1, it does not point to public version—T1.CID1.EBM. Rather, it now points to its private version of T1bitmap 1402 private x2.T1.EBM, where R1 with RID1 is marked as deleted. Likewise, after x3 deletes R100, it points to bitmap 1406 private x3.T1.EBM, where row 100 is marked as deleted. If x2 reads immediately of same table T1 at this point of time, x2 will not see R1 because it is marked as deleted in its private bitmap. However, x2 will see R100 because it is not deleted in its private bitmap 1402 private x2.T1.EBM. In the same fashion, while transaction x3 does not see R100 which is marked as deleted in its private bitmap, x3 may still see R1, because R1 is still valid in its private bitmap 1406 private x3.T1.EBM.

Figure 15:
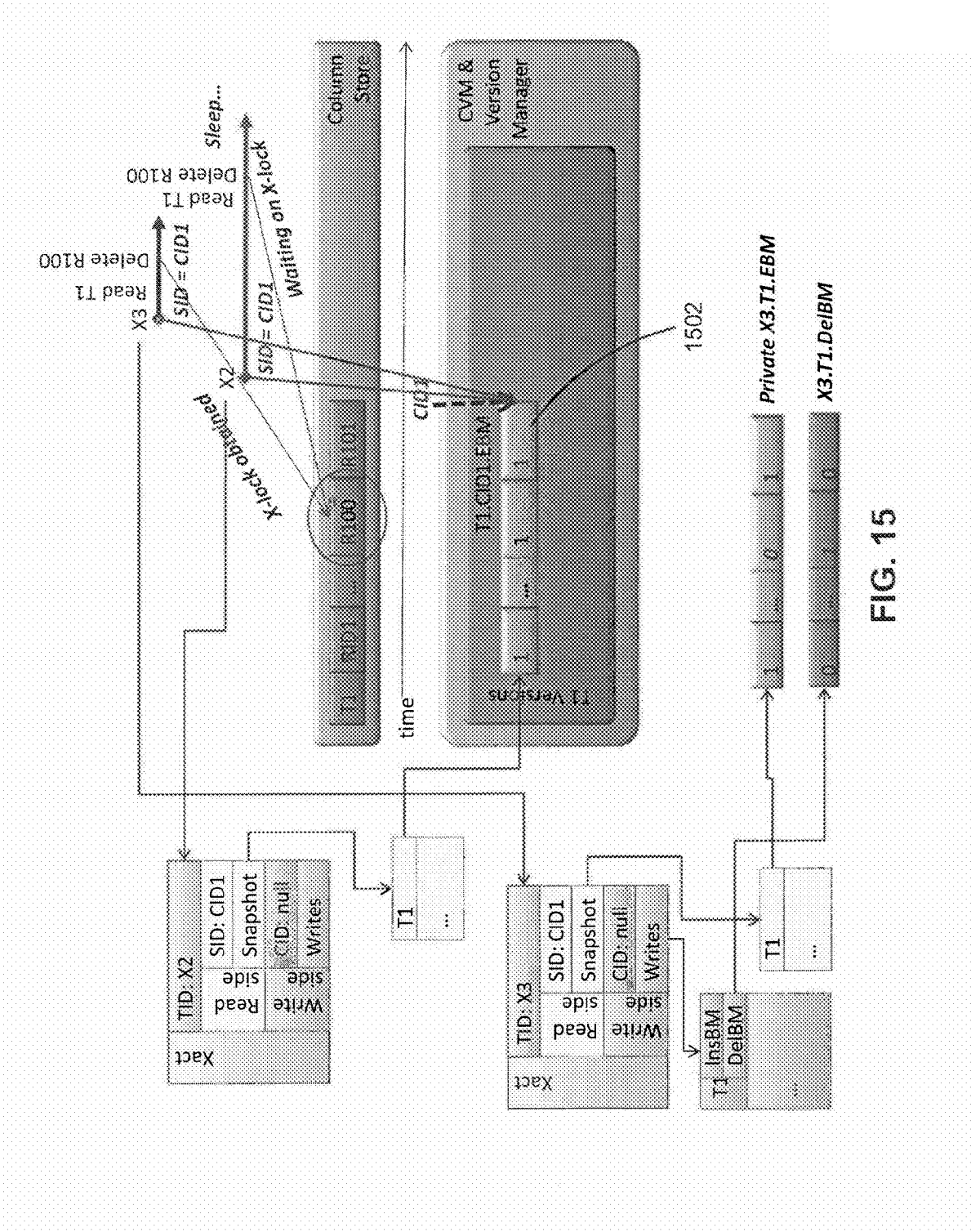

FIG. 15 shows two concurrent transactions attempting to delete the same row of the same table, according to an embodiment. For example, transactions x2 and x3 both attempt to delete R100. According to the rules of row-level versioning, such deletions are illegal because no two transactions can delete the same row concurrently and the same transaction cannot delete the same row twice. Therefore, RLV snapshot rule imposes a limit to the isolation of two transactions—not allow two transactions to delete the same row concurrently. Since an update is a deletion followed by insertion, the same rule also prevents the same row to be updated by two transactions concurrently.

In one embodiment, this rule is implemented via an exclusive lock. In an event that a transaction deletes a row, it gets an exclusive lock on a row of the same version/snapshot of the table. In this example, x3 manages to delete R100 first, and gets the exclusive lock. When x2 subsequently reads and attempts to delete R100, because R100 is visible in x2's private bitmap, which may not prevent x2 from deleting R100. However, when x2 tries to delete R100, it is waiting on the lock and goes to sleep. The event follows will be illustrated in FIG. 16 below.

Figure 16:
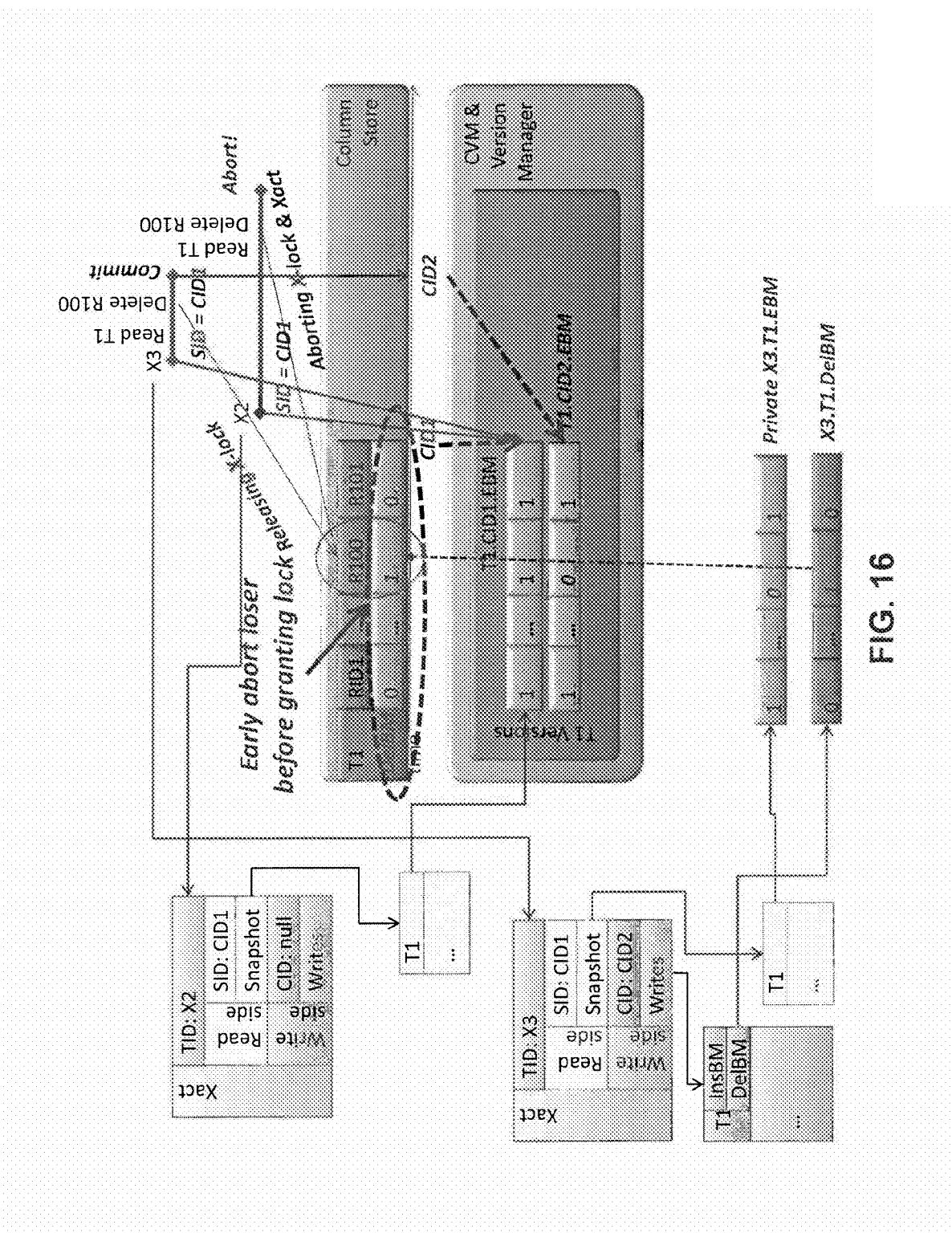

In FIG. 16, while x2 is still waiting on the lock, x3 commits. Since x2 now has no chance of success in deleting R100, x2 aborts "delete R100" operation and the transaction. In one embodiment, x2 does not abort immediately when it is waiting on the lock, because x3 may fail before it commits and release the lock accordingly. In such scenario, x2 may obtain the lock and proceed to delete R100.

Figure 17:
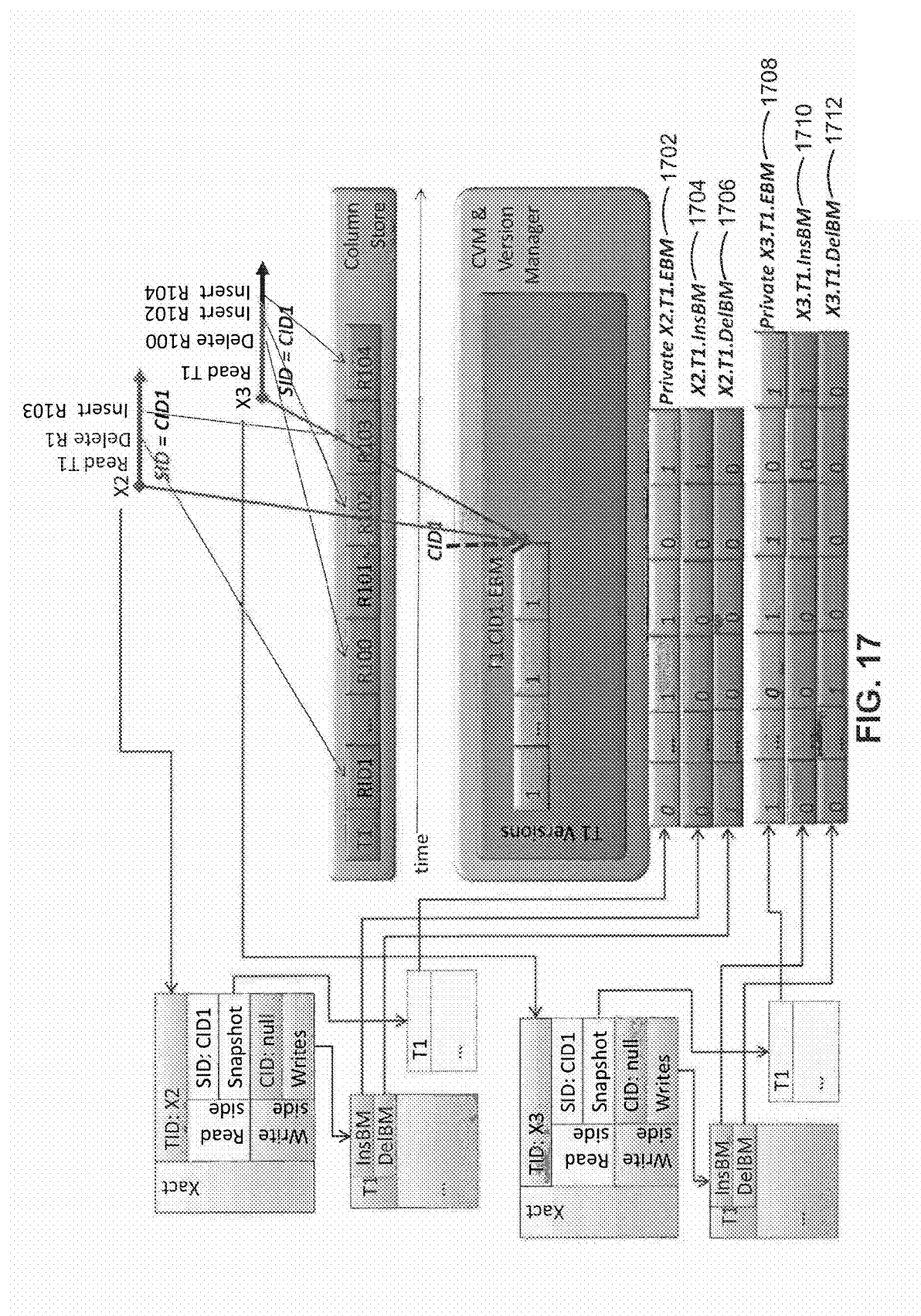

FIG. 17 shows non-conflicting concurrent transactions, according to an embodiment. Given that x2 and x3 do not attempt to delete the same row in table T1—indeed, x2 deletes R1 with RID1 and x3 deletes R100—the transactions may behave independently from each other. For example, x2 may record the delete and inserts in bitmap 1702 private x2.T1.EBM, bitmap 1704 x2.T1.InsBM and bitmap 1706 x2.T1.DelBM. And x3 may record the delete and inserts in bitmap 1708 private x3.T1.EBM, bitmap 1710 x3.T1.InsBM and bitmap 1712 x3.T1.DelBM. Notably, insert operations may not conflict for concurrent transactions x2 and x3, because new rows may be inserted with new RIDs. In the example illustrated in FIG. 17, no transaction has committed and each transaction has its private bitmaps.

Figure 18:
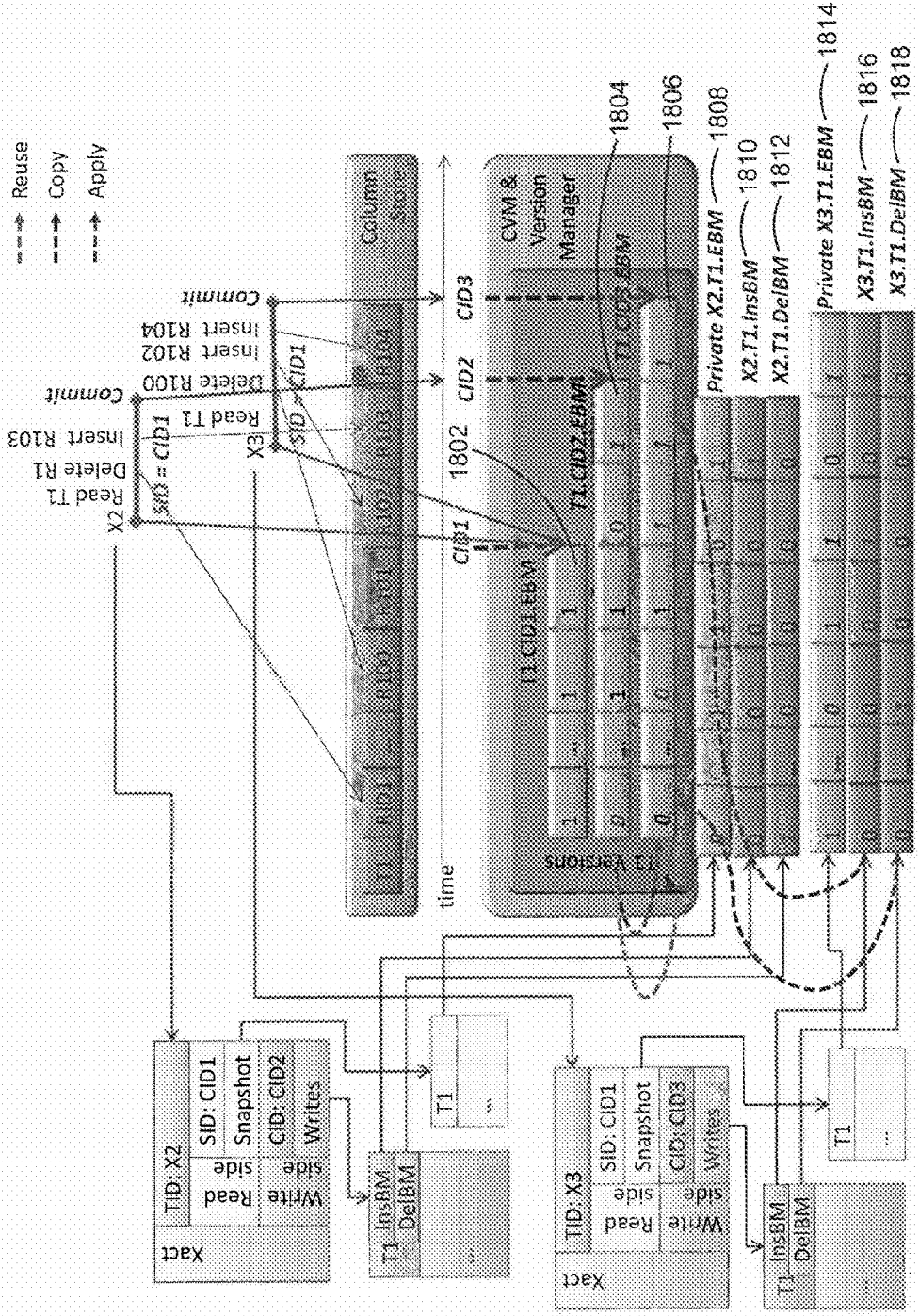

Continuing from FIG. 17, x2 commits before x3 does in FIG. 18. From the perspective of x2, the latest committed ID is CID1, because no transaction commits between the time period from x1 commits to x2 commits. Bitmap 1802 T1.CID1.EBM provides the baseline for transaction x2. After x2 commits and to create a new version of T1, x2 may apply the inserts and deletes to baseline bitmap 1802 T1.CID1.EBM, which generates bitmap 1808 private X2.T1.EBM. In some embodiment, this is accomplished by copying or registering bitmap 1808 private X2.T1.EBM as public version of table T1 represented by bitmap 1804 T1.CID2.EBM. Once the public bitmap is generated, x2 may not need to reference bitmap 1810 x2.T1.InsBM and bitmap 1812 x2.T1.DelBM.

In the example of x3, when x3 commits, it checks for the latest transaction that is committed before x3 and identifies that it is x2 with commit ID CID2. In this situation, bitmap 1814 private x3.T1.EBM cannot be simply registered as the public bitmap. Otherwise, it may lose all the deletes and inserts executed in x2. For example, x2 has inserted R103, and bitmap 1814 private x3.T1.EBM does not contain R103. Thus, the latest committed bitmap—1804 T1.CID2.EBM—need to be aggregated with the internal operations of x3 recorded in bitmaps 1816 x3.T1.InsBM and 1818 x3.T1.DelBM to create a new public version of table T1. As previously noted, the new version may be generated by a union with bitmap 1816 x3.T1.InsBM and a subtracting of bitmap 1818 x3.T1.DelBM. Accordingly, a new version of table T1 represented by bitmap 1806 T1.CID3.EBM may be built and registered as a new public version.

From the description of the figures above, the user transactions may not be concerned with the versioning mechanism of the main store, because the transaction does not impact main store until a merge occurs. Furthermore, there is no need for user transactions to access the underlying main store to do any data changes. For concurrent transactions, they may be handled by the creation of two versions of snapshots or bitmaps of the underlying table.

In some embodiments, insert and delete operations go to a delta store or PlexIM store that implements a RLV mechanism and sets the corresponding bits in the insert and delete bitmaps. Those bitmaps cover the RID range of both main and delta stores, but are not managed by main store. Indeed, main store may no aware the existence of the bitmaps. As a result, it requires minimal changes to more store to support RLV mechanism.

Furthermore, the external visible behavior may be handled by inserting data in the delta store, and such new data may not be visible to main until merge. In contrast, the internal operation, such as a merge, which may modify the main store and create a new version of main store, is invisible to user transactions. From the point of main store, there may only be one transaction that executing large changes—the accumulated insertions and deletions—at merge time.

According to an embodiment, an insert operation means inserting data to a delta column store and marking the corresponding row as visible in the insert bitmap. On the contrary, a delete operation does not involve actual value operation in the delta store portion or main store of the table. The corresponding rows may be marked in the delete bitmap as not visible. According to another embodiment, a commit operation is a pure bitmap operation, which creates a new bitmap based on the aggregation of the insert and delete bitmap.

In the example illustrated above, a column store may include a main store and a delta/PlexIM store. A column of a table may have multiple fragments, such as one fragment in the main store and another fragment in the delta store. In an embodiment, main and delta stores are appended, with the delta store allocated on top of main store.

Main store may implement a table-level versioning mechanism, which does not accept concurrent transactions on the same table. In the PlexIm store, it implements row-level versioning and accepts concurrently transactions on the same table. In some embodiment, there is no change to the column store, which still has table-level versioning and does not accept concurrent transactions. The only writer to main store may be the merge operation, which is a heavy operation carrying with it a large amount of data yet not concurrent, since there may be only one writer writing to the main store. After the merge, a new table-level version of main store may be created.

In some embodiments, applications may not know this table-level version limitation of the main store, as they may consistently see there is a column store that allows concurrent transactions on the same table. Under such RLV mechanism, two transactions may concurrently update the same table, but they are not allowed to update the same row concurrently. Therefore, applications may see the whole column store as supporting row-level-version.

In some embodiments, once a delta or PlexIM store reaches a threshold, it merges with main store. As a result, a large amount of data is stored in main store. Main handles such data gracefully, but does not know the existence of concurrent transactions, because the delta store is the application-facing store. An system implementing RLV may implement the rule that two transactions cannot delete the same row concurrently. However, if there is no conflicts between the transactions, any two transactions may change the same table concurrently any other ways.

In some embodiments, the bitmaps are used by the readers. A transaction that does not write internally may use the public bitmap. Conversely, a transaction that modifies and subsequently reads the table may use the private EBM, which is based on a baseline pubic bitmap and modified by the transaction's inserts and deletes. If a private bitmap is created, it may be kept up to date with the execution of additional operations. Alternatively, a private bitmap may be created lazily. The private bitmap may be used by read-my-write operations. At commit time, a public version is created by applying insert/deletion on the latest public version. If no other transaction has created a public version in the mean time, the private bitmap may be copied or registered as a public version. If there is intervening transaction that has created a new public version between the start and commit of the instant transaction, the inserts/deletes may be applied to the latest public version.

Example Computer System Implementation

Embodiments shown in FIGS. 1-18, or any part(s) or function(s) thereof, may be implemented using hardware, software modules, firmware, tangible computer readable media having instructions stored thereon, or a combination thereof and may be implemented in one or more computer systems or other processing systems.

Figure 19:
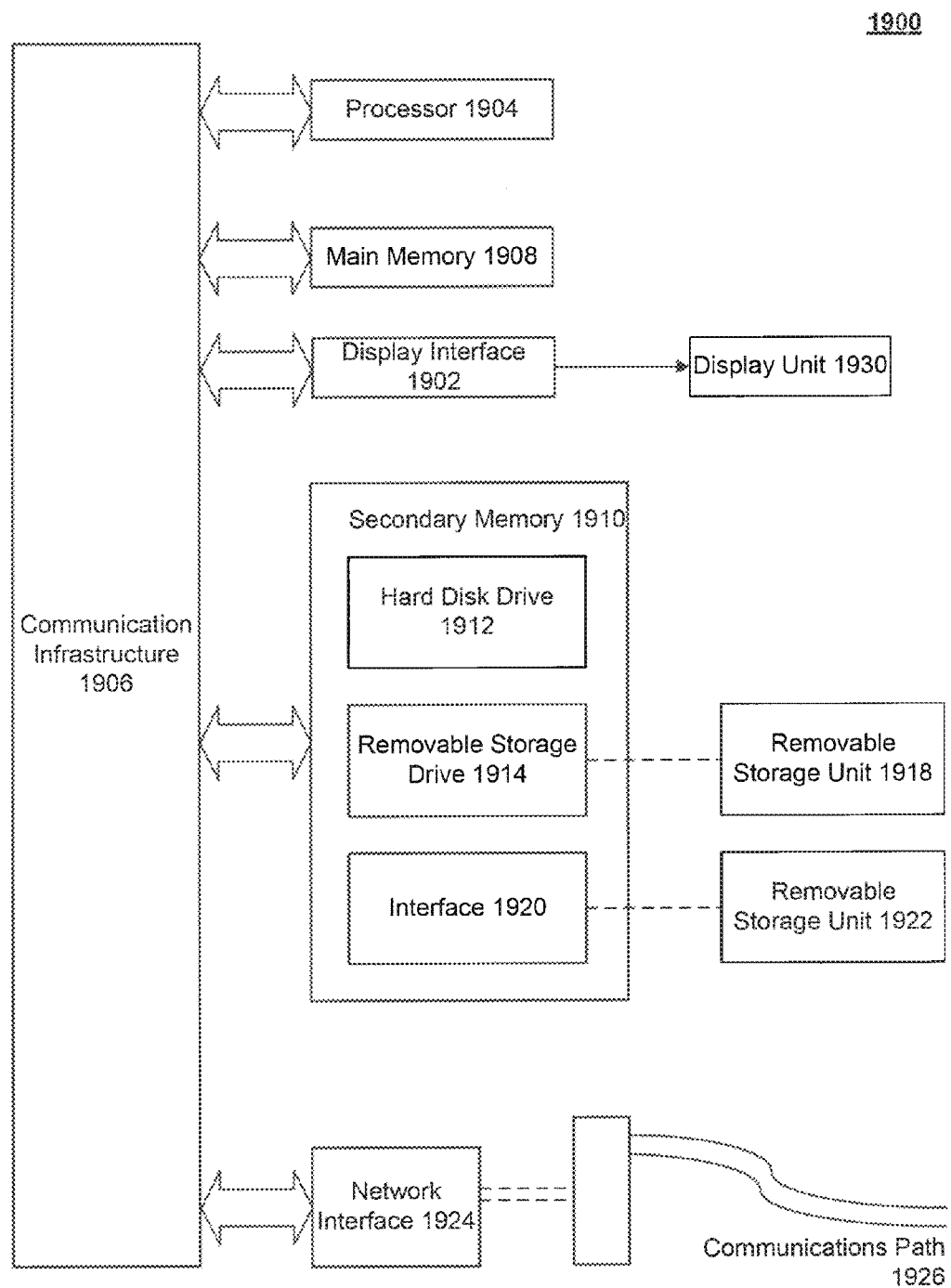
FIG. 19 is a diagram of an example computer system in which embodiments can be implemented, according to an embodiment.

FIG. 19 illustrates an example computer system 1900 in which embodiments, or portions thereof, may be implemented as computer-readable code. For example, RLVE 115, including its components, as shown in FIG. 2, can be implemented in computer system 1900 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-18.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 1900. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1904 may be a special purpose or a general purpose processor device. As will be appreciated by persons skilled in the relevant art, processor device 1904 may also be a single processor in a multi-core/multiprocessor system, such system operating alone, or in a cluster of computing devices operating in a cluster or server farm. Processor device 1904 is connected to a communication infrastructure 1906, for example, a bus, message queue, network, or multi-core message-passing scheme.

Computer system 1900 also includes a main memory 1908, for example, random access memory (RAM), and may also include a secondary memory 1910. Secondary memory 1910 may include, for example, a hard disk drive 1912, removable storage drive 1914. Removable storage drive 1914 may comprise a floppy disk drive, a magnetic tape drive, an optical disk drive, a flash memory, or the like. The removable storage drive 1914 reads from and/or writes to a removable storage unit 1918 in a well-known manner. Removable storage unit 1918 may comprise a floppy disk, magnetic tape, optical disk, etc. which is read by and written to by removable storage drive 1914. As will be appreciated by persons skilled in the relevant art, removable storage unit 1918 includes a computer usable storage medium having stored therein computer software and/or data.

In alternative implementations, secondary memory 1910 may include other similar means for allowing computer programs or other instructions to be loaded into computer system 1900. Such means may include, for example, a removable storage unit 1922 and an interface 1920. Examples of such means may include a program cartridge and cartridge interface (such as that found in video game devices), a removable memory chip (such as an EPROM, or PROM) and associated socket, and other removable storage units 1922 and interfaces 1920 which allow software and data to be transferred from the removable storage unit 1922 to computer system 1900.

Computer system 1900 may also include a network interface 1924. Network interface 1924 allows software and data to be transferred between computer system 1900 and external devices. Network interface 1924 may include a modem, a network interface (such as an Ethernet card), a communications port, a PCMCIA slot and card, or the like. Software and data transferred via network interface 1924 may be in the form of signals, which may be electronic, electromagnetic, optical, or other signals capable of being received by network interface 1924. These signals may be provided to network interface 1924 via a communications path 1926. Communications path 1926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1918, removable storage unit 1922, and a hard disk installed in hard disk drive 1912. Computer program medium and computer usable medium may also refer to memories, such as main memory 1908 and secondary memory 1910, which may be memory semiconductors (e.g. DRAMs, etc.).

Computer programs (also called computer control logic) are stored in main memory 1908 and/or secondary memory 1910. Computer programs may also be received via network interface 1924. Such computer programs, when executed, enable computer system 1900 to implement embodiments as discussed herein. In particular, the computer programs, when executed, enable processor device 1904 to implement the processes of embodiments of the present invention, such as the stages in the methods illustrated by flowchart 300 of FIG. 3, discussed above. Accordingly, such computer programs represent controllers of the computer system 1900.

Where embodiments are implemented using software, the software may be stored in a computer program product and loaded into computer system 1900 using removable storage drive 1914, interface 1920, and hard disk drive 1912, or network interface 1924.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for a database system, comprising:
   establishing a column-based in-memory database including a main store and a delta store, wherein the main store does not allow concurrent transactions on a same table and the delta store has a plurality of row-visibility bitmaps implementing a row-level versioning mechanism that allows concurrent transactions on the same table;
   receiving a transaction associated with the column-based in-memory database, the transaction comprising one or more internal operations associated with the transaction;
   for each table read by the transaction, determining a version of the tab in the delta store that represents a transaction-consistent snapshot of the database visible to the transaction, wherein each table is represented in the main store and the delta store, and each version of the table is represented by one or more bitmaps;
   for each table written by the e transaction, generating a private version of the table using one or more bitmaps, wherein the private version of the table is configured to accumulate results from the one or more internal operations, and wherein the private version of the table is invisible to a second transaction;
   upon execution of a Data Manipulation Language (DML) as part of the transaction, for each table written by the transaction, recording data changes generated by the transaction in the corresponding private version of the table; and
   upon commit of the transaction, for each table written by the transaction, generating a new public version of the table based on the private version of the table by marking the private versions of the table as public.

2. The method of claim 1, further comprising:
   accumulating, for each table, the data changes of a plurality of transactions in the delta store; and
   merging the delta store with the main store to apply the data changes generated by the plurality of the transactions accumulated in the delta store to the main store.

3. The method of claim 1, wherein the one or more bitmaps representing the each version of the table include an insertion bitmap.

4. The method of claim 1, wherein the one or more bitmaps representing the each version of the table includes a deletion bitmap.

5. The method of claim 4, wherein the deletion bitmap includes a delta store section corresponding to a delta store portion of the table and a main store section corresponding to a main store portion of the table.

6. The method of claim 5, wherein the main store section of the deletion bitmap provides t he row-level versioning semantics of the main store.

7. The method of claim 1, wherein the delta store provides row-level versioning semantics to the main store. so that the database behaves as having row-level versioning mechanism to a database client.

8. The method of claim 1, wherein the recording further comprises:
   inserting both new data in the delta store and corresponding entries in the insertion bitmap of the delta store, when the transaction is an inserting operation.

9. The method of claim 1, wherein the recording further comprises:
   invalidating corresponding entries in the deletion bitmap of the delta store, either in the delta store section or in the main store of the deletion bitmap, when the transaction is a deleting operation.

10. The method of claim 5, wherein the recording further comprises:
    inserting both new data in the delta store of the table and corresponding entries in an insertion bitmap of the delta store and invalidating the corresponding entries in the deletion bitmap of the delta store, either in the delta store section or in the main store section of the deletion bitmap, when the transaction is an updating operation.

11. A system, comprising:
    one or more processors configured to implement:
    a column store establisher, configured to establish a column-based in-memory database including a main store and a delta store, wherein the main store does not allow concurrent transactions on a same table and the delta store has a plurality of row-visibility bitmaps implementing a row-level versioning mechanism that allows concurrent transactions on the same table;
    a transaction receiver, configured to receive a transaction associated with the column-based in-memory database, the transaction comprising one or more internal operations associated with the transaction;
    a version determiner, for each table read by the transaction, configured to determine a version of the table in the delta store that represents a transaction-consistent snapshot of the database visible to the transaction, wherein each table is represented in the main store and the delta store, and each version of the table is represented by one or more bitmaps;
    a transaction recorder, upon execution of a Data Manipulation Language (DML) as part of the transaction, for each table written by the transaction, configured to:
    generate a private version of the table using one or more bitmaps, wherein the private version of the table is configured to accumulate results from the one or more internal operations, and wherein the private version of the table is invisible to a second transaction, and
    record data changes generated by the transaction in the private version of the table; and
    a public version generator, upon commit of the transaction, for each table written by the transaction, configured to generate a new public version of the table based on the private version of the table by marking the private version of the table as public.

12. The system of claim 11, further comprising:
    a transaction accumulator, configured to accumulate, for each table, the data changes of a plurality of transactions in the delta store; and
    a store merger, configured to merge the delta store with the main store to apply the data changes generated by the plurality of the transactions accumulated in the delta store to the main store.

13. The system of claim 11, wherein the one or more bitmaps representing the each version of the table include an insertion bitmap.

14. The system of claim 11, wherein the one or more bitmaps representing the each version of the table includes a deletion bitmap.

15. The system of claim 14, wherein the deletion bitmap includes a delta store section corresponding to a delta store portion of the table and a main store section corresponding to a main store portion of the table.

16. The system of claim 15, wherein the main store section of the deletion bitmap provides the row-level versioning semantics of the main store.

17. The system of claim 11, wherein the delta store is configured to provide row-level versioning semantics to the main store, so that the database behaves as having row-level versioning mechanism to a database client.

18. The system of claim 11, wherein the transaction recorder is further configured to:
insert both new data in the delta store and corresponding entries in an insertion bitmap of the delta store, when the transaction is an inserting operation.

19. The system of claim 11, wherein the transaction recorder is further configured to:
invalidate corresponding entries in a deletion bitmap of the delta store, either in the delta store section or in the main store of the deletion bitmap, when the transaction is a deleting operation.

20. The system of claim 15, wherein the transaction recorder is further configured to:
insert both new data in the delta store of the table and corresponding entries in an insertion bitmap of the delta store and invalidate the corresponding entries in the deletion bitmap of the delta store, either in the delta store section or the main store section of the deletion bitmap, when the transaction is an updating operation.

21. A non-transitory computer program product comprising a computer readable storage medium having instructions encoded thereon that, when executed by a processor, cause the processor to perform operations comprising:
establishing a column-based in-memory database including a main store and a delta store, wherein the main store does not allow concurrent transactions on a same table and the delta store has a plurality of row-visibility bitmaps implementing a row-level versioning mechanism that allows concurrent transactions on the same table;
receiving a transaction associated with the column-based in-memory database, the transaction comprising one or more internal operations associated with the transaction;
for each table read by the transaction, determining a version of the table in the delta store that represents a transaction-consistent snapshot of the database visible to the transaction, wherein each table is represented in the main store and the delta store, and each version of the table is represented by one or more bitmaps;
for each table written by the transaction, generating a private version of the table using one or more bitmaps, wherein the private version of the table is configured to accumulate results from the one or more internal operations, and wherein the private version of the table is invisible to a second transaction;
upon execution of a Data Manipulation Language (DML) as part of the transaction, for each table written by the transaction, recording data changes generated by the transaction in the corresponding private version of the table; and
upon commit of the transaction, for each table written by the transaction, generating a new public version of the table based on the private version of the table, by marking the private version of the table as public.

* * * * *